United States Patent
Canat et al.

(10) Patent No.: US 9,236,704 B2
(45) Date of Patent: Jan. 12, 2016

(54) OPTIC FIBER AMPLIFIER HAVING A HIGH BRILLOUIN THRESHOLD AND METHOD FOR MAKING SUCH AN AMPLIFIER

(71) Applicant: Office National d'Etudes et de Recherches Aérospatiales-ONERA, Palaiseau (FR)

(72) Inventors: Guillaume Canat, Villebon sur Yvette (FR); Laurent Lombard, Paris (FR); Julien Le Gouët, Arcueil (FR); Didier Fleury, Clamart (FR)

(73) Assignee: Office National d'Etudes et de Recherches Aérospatiales-ONERA, Palaiseau (FR)

( * ) Notice: Subject to any disclaimer, the term of this patent is extended or adjusted under 35 U.S.C. 154(b) by 0 days.

(21) Appl. No.: 14/417,334

(22) PCT Filed: Jul. 2, 2013

(86) PCT No.: PCT/EP2013/063955
§ 371 (c)(1),
(2) Date: Jan. 26, 2015

(87) PCT Pub. No.: WO2014/016083
PCT Pub. Date: Jan. 30, 2014

(65) Prior Publication Data
US 2015/0194787 A1    Jul. 9, 2015

(30) Foreign Application Priority Data
Jul. 24, 2012    (FR) ...................................... 12 57173

(51) Int. Cl.
*H01S 3/067* (2006.01)
*G02B 6/44* (2006.01)
(Continued)

(52) U.S. Cl.
CPC ............. *H01S 3/302* (2013.01); *H01S 3/06704* (2013.01); *H01S 3/06708* (2013.01);
(Continued)

(58) Field of Classification Search
CPC ............ H01S 3/06754; H01S 3/06704; H01S 2301/03; G02B 6/4457; G02B 6/4458
See application file for complete search history.

(56) References Cited

U.S. PATENT DOCUMENTS

| 7,486,852 B2 | 2/2009 | Rothenberg | |
| 2004/0175081 A1* | 9/2004 | DeWitte | H01S 3/102 385/123 |

(Continued)

OTHER PUBLICATIONS

Yoshizawa et al., "Proposal for Stimulated Brillouin Scattering Suppression by Fibre Cabling", Electronics Letters, vol. 27, No. 12, pp. 1100-1101 (1991).*

(Continued)

*Primary Examiner* — Eric Bolda
(74) *Attorney, Agent, or Firm* — Osha Liang LLP

(57) ABSTRACT

According to one aspect, the invention relates to an optic fiber amplifier having a high Brillouin threshold, and including: an amplification optic fiber (16) comprising a core and a sheath and suitable for amplifying a signal beam travelling in said core; means for coupling the signal beam in an input end of said amplification optic fiber; means for coupling a pump laser beam for pumping said amplification optic fiber; a structure (330, 340) including a deformable portion around which at least one portion of said amplification optic fiber is wound in the shape of turns, said turns being in contact with a surface of said deformable portion, wherein the friction of said optic fiber on said surface resulting, during the deformation of said deformable portion, in an elongation of said amplification optic fiber according to an elongation profile that varies from one turn to the other.

19 Claims, 8 Drawing Sheets

(51) Int. Cl.
  *H01S 3/30* (2006.01)
  *H01S 3/00* (2006.01)

(52) U.S. Cl.
  CPC ......... *H01S3/06754* (2013.01); *G02B 6/4457* (2013.01); *H01S 3/0014* (2013.01); *H01S 2301/03* (2013.01)

(56) References Cited

U.S. PATENT DOCUMENTS

| | | | |
|---|---|---|---|
| 2006/0251425 A1 | 11/2006 | Kupershmidt et al. | |
| 2007/0019283 A1* | 1/2007 | Mermelstein | H01S 3/06758 359/334 |
| 2007/0019918 A1 | 1/2007 | Rothenberg | |
| 2009/0003786 A1 | 1/2009 | Takahashi et al. | |
| 2009/0110355 A1 | 4/2009 | DeMeritt et al. | |

OTHER PUBLICATIONS

International Search Report issued in PCT/EP2013/063955 mailed on Nov. 27, 2013 (6 pages).
Written Opinion of the International Searching Authority issued in PCT/EP2013/063955 mailed on Nov. 27, 2013 (13 pages).
Saxena, I. et al.; "Optical fiber static strain sensors: reliability issues"; SPIE, vol. 6770, 2007, pp. 67700C-1-67700C-12 (12 pages).
Engelbrecht, R. et al.; "SBS shaping and suppression by arbitrary strain distributions realized by a fiber coiling machine"; IEEE/LEOS Winter Topicals Meeting Series, Jan. 12, 2009, pp. 248-249 (2 pages).

* cited by examiner

OPTIC FIBER AMPLIFIER HAVING A HIGH BRILLOUIN THRESHOLD AND METHOD FOR MAKING SUCH AN AMPLIFIER

PRIOR ART

1. Technical Field of the Invention

The present invention relates to an optical fiber amplifier with high Brillouin threshold and a method of manufacture of such an amplifier.

2. Prior Art

An optical fiber amplifier generally comprises an amplifying optical fiber and a device for coupling an incident signal laser beam, called a signal beam in the subsequent description, intended to be amplified in said fiber. Doped-fiber amplifiers and nonlinear-fiber amplifiers are known. In a doped-fiber amplifier, a portion of the optical fiber is doped with a substance able to engender an optical gain, for example dopant ions of rare earth ion type, and is pumped optically with a laser pump beam so as to place the dopant ions in an excited state. When a signal beam passes through the doped fiber portion, it de-excites the ions by laser effect, producing a photon identical to the incident photon. There is thus amplification of the signal beam. In a non-linear optical fiber amplifier, one or more pump laser beam(s) create a gain by generating a non-linear polarization, using for example the Raman or Kerr effects. In both these types of amplifiers, one speaks of co-propagating pumping if the pump beam and the signal beam propagate in the same direction. In the opposite case one speaks of counter-propagating pumping. If a pump beam is coupled in both directions one speaks of bidirectional pumping. FIGS. 1A and 1B represent two examples of amplifiers 10 comprising an amplifying optical fiber 16 and operating respectively in co-propagating and counter-propagating mode. The device for coupling the signal beam that it is sought to amplify comprises in the examples of FIGS. 1A and 1B fibered coupling elements including for example a connector 11 itself spliced to the amplifying optical fiber 16. Alternatively, the coupling of the signal beam in the amplifying fiber can be obtained by non-fibered optical elements. The amplifier 10 can comprise other fibered passive optical elements, for example an isolator, a filter and/or one or more connectors, all these elements being spliced. In the example illustrated in FIGS. 1A and 1B, an isolator 12 is arranged between the connector 11 and the amplifying fiber 16 for example by means of splices 15. The isolator makes it possible to greatly reduce any return of laser light toward the components situated upstream of the amplifier. In particular, the amplifier 10 can comprise a fibered optical element fitted with a passive optical fiber pigtail 17 at the output of the amplifying fiber 16. The fibered element is for example a connector 14 making it possible to direct the amplified beam toward other optical components intended to collimate or focus the amplified beam. It may also entail a pump coupler or isolator. This component will subsequently be referred to indiscriminately as an output fiber pigtail. The connectors 11 and 14 are for example connectors of FC/APC type (according to the expression "Fiber Connector/Angle Polished Connector"). In the same manner, a fibered or non-fibered coupling device 13 makes it possible to couple the pump beam in the fiber, in these examples pump beams arising from laser sources, for example laser diodes. In the case of co-propagating pumping, the same optical coupling component can make it possible to couple the signal beam and the pump beam.

In the case of a spectrally narrow signal beam (spectral width typically less than 100 MHz), saturation of the laser power transmitted due to a nonlinear effect in the fiber called stimulated Brillouin scattering (or the SBS effect) is observed beyond a power threshold ($P_{th}$). Beyond this power threshold, called the Brillouin threshold, the extra laser power is reflected in the form of a wave termed a Stokes wave resulting from the interaction of the incident wave with auto-generated acoustic waves which propagate in the optical fiber. More precisely, hereinafter in the patent application, the Brillouin threshold is defined as the optical power of the signal beam at the amplifier output beyond which a given percentage of the incident light energy is backscattered, this percentage being taken equal hereinafter to 10%. The Stokes wave exhibits an optical frequency $v_s$ shifted in frequency (by the Doppler effect) according to $v_s = v - v_B$ where $v$ is the frequency of the incident wave and $v_B$, called the Brillouin frequency, is the frequency of the acoustic wave (about 10 GHz for a signal at 1.5 μm). Even in the absence of a counter-propagating signal at the frequency $v_s$, the Stokes wave is generated by amplification of the photons arising from the quantum noise propagating in the opposite direction to the incident signal. The corresponding gain curve possesses an in general Lorentzian form centered around $v_B$ and of width $\Delta v_B$~40 MHz. It is easy to measure the spectrum of the backscattered Stokes wave. In the limit where the gain undergone by the Stokes photons is low (less than $10^5$ typically), the spectrum of the Stokes wave is proportional to the spectrum of the Brillouin gain. Examples of gain curves arising from the article by G. Canat et al. ("Characteristics of the Brillouin spectra in Erbium-Ytterbium fibers", Opt. Express 16, 3212-3222 (2008)) are illustrated in FIG. 2. Curves 21, 22, 23 correspond to fibers E, B, C respectively, some characteristics of which are given in table 1 hereinbelow. These are Erbium Ytterbium doped optical fibers originating from various manufacturers. The Brillouin frequency $v_B$ is a function of the local speed of the acoustic waves of the fiber. It is established in the literature that $v_B$ depends on the composition of the fiber, its state of elongation $\epsilon$, and its temperature. Thus in the examples illustrated in FIG. 2, Brillouin frequencies taking values lying between 10.12 GHz and 10.43 GHz are observed (for a measurement at 1552 nm), these values depending in particular on the phosphorus and aluminum doping which are the main codopants of these fibers and the concentration profile of the codopants along the fiber.

TABLE 1

| Fiber | Dopants | Core diameter (μm) | Numerical aperture | Brillouin Frequency of the main peak $v_B$ | Spectral width at 3 dB |
|---|---|---|---|---|---|
| B | Er, Yb | 6.3 | 0.16 | 10.31 GHz | 50 MHz |
| C | Er, Yb | 20 | 0.14 | 10.46 GHz | 48 MHz |
| E | Er, Yb | 18 | 0.18 | 10.19 GHz | 57 MHz |

Numerous publications have proposed techniques for reducing the SBS effect in optical fiber amplifiers. In particular, by varying $v_B$ along the fiber, the SBS effect occurrence threshold is increased since the amplification of the Stokes wave is cumulative only in the gain band $\Delta v_B$.

A machine making it possible to coil an optical fiber with an elongation profile varying along the fiber has thus been proposed (see R. Engelbrecht et al. "SBS shaping and suppression by arbitrary strain distributions realized by a fiber coiling machine", *IEEE/LEOS Winter Topicals Meeting Series*, 2009, paper WC1.3., pp. 248-249, 12-14 Jan. 2009). The article describes how a passive optical fiber can be coiled on a cylinder by varying the tension applied during the coiling with a computer driven spool, allowing a broadening of the Brillouin gain curve accompanied by an appreciable increase in the Brillouin threshold. Although this technique is described in a non-amplifying passive fiber of several hundred meters, the authors suggest applying this technique to fiber-based amplifiers. However, this would necessitate coiling the fiber and stretching it before assembling the amplifier, which on the one hand, makes it necessary to leave on either side pieces of fiber which are strain free and therefore liable to exhibit a significant Brillouin effect, and, on the other hand does not make it possible to optimize the elongation profile once the amplifier has been produced since a modification of the stretch would require complete dismantling of the latter. Moreover, the machine described for coiling the fiber is complex and bulky.

U.S. Pat. No. 7,486,852 proposes an alternative technique in which a fibered structure is produced, comprising an optical fiber sealed inside a structure possessing a neutral axis. The structure obtained is placed in a strain free state and is then deformed in such a way as to generate a variation of curvature which induces a longitudinal elongation gradient so as to increase the Brillouin threshold. The fiber is sealed in the structure at a variable given distance from the neutral axis in such a way that very large compressive stresses can be transmitted along the fiber by deformation of the structure. By comparison with the technique described in R. Engelbrecht et al., this technique makes it possible to modify the spectral shape of the Brillouin gain in phases of fine tuning of the fiber amplifier by applying deformations on the fibered structure. However, the precise positioning of the fiber with respect to the neutral axis is not without its difficulties and the latter can no longer be modified once the fiber has been sealed. The sealing of the fiber also greatly constrains the conditions of thermal exchanges between the fiber which heats up under the effect of the non-radiative transitions and the surrounding medium. For fibers pumped with high power, this results in heating of the fiber which may be problematic.

An object of the invention consists in proposing a fiber amplifier which exhibits a high Brillouin threshold without the limitations of the prior art. In particular, an object of the invention is to propose an optical fiber amplifier of simple design, the spectral shape of whose Brillouin gain can be easily tailored in the amplifier fine tuning phases.

SUMMARY OF THE INVENTION

According to a first aspect, the present patent application relates to an optical fiber amplifier with high Brillouin threshold comprising:
- an amplifying optical fiber comprising a core and a cladding, which is suitable for the amplification of a signal beam propagating in said core;
- means for coupling a signal beam in an input end of said amplifying optical fiber,
- means for coupling a laser pump beam for the pumping of said amplifying optical fiber,
- a structure comprising a deformable part around which at least one part of said amplifying optical fiber is wound in the form of coils, said coils being in contact with a surface of said deformable part, the rubbing of said optical fiber on said surface causing during the deformation of said deformable part an elongation of said amplifying optical fiber according to an elongation profile varying from one coil to the next.

Such a structure makes it possible in particular to undertake adjustments of the elongation of the amplifying fiber and therefore of the Brillouin gain in the phases of testing the complete optical fiber amplifier, that is to say equipped for example with the fibered coupling elements and other elements intended to be spliced to the amplifying optical fiber, these elements being able to influence the spectral shape of the Brillouin gain.

According to a variant, the amplifying optical fiber is fixed to said structure at a given number of fixing points, the elongation of the amplifying optical fiber at said fixing points being less than 0.3%. Such a structure makes it possible to attain significant elongation values and therefore a larger rise in the Brillouin threshold without risk of delamination of the amplifying optical fiber.

According to a variant, the distance between the fixing point closest to an output end of the amplifying optical fiber and said output end is less than 25 cm, limiting the unstrained amplifying optical fiber length.

According to a variant, the elongation profile comprises several local extrema, the absolute values of the variations in elongation between two extrema forming an increasing series between the input and the output of the amplifying optical fiber, the applicant having demonstrated that significant variations in elongation at the fiber output where the optical power is a maximum allows a rise in the Brillouin threshold.

According to a variant, the elongation profile comprises a single local maximum. The applicant has shown that in most cases, such a type of elongation profile turned out to be very effective in increasing the Brillouin threshold.

For example, when the means for coupling the pump beam are suitable for a co-propagating pumping in the pump cladding, the elongation profile can advantageously comprise a single local maximum, attained in the vicinity of a given distance from the input end of the amplifying optical fiber, the distance being a fraction x of the length of the amplifying optical fiber such that $0.4 < x < 0.6$, the applicant has shown that this profile allowed optimization of the rise in the Brillouin threshold as a function of elongation. For example, the local maximum is substantially in the middle of the input and output ends.

According to another example, when the means for coupling the pump beam are suitable for a counter-propagating pumping in the pump cladding or co-propagating pumping in the core, the elongation profile can advantageously comprise a single local maximum, attained in the vicinity of a given distance from the input end of the amplifying optical fiber, the distance being a fraction x of the length of the amplifying optical fiber such that $0.5 < x < 0.9$.

According to a variant, the deformable part of the structure comprises at least two rigid parts around which said part of the optical fiber is coiled, the deformation of the structure being obtained by separation of said rigid parts. This structure makes it possible by simple adjustment of the separation between the rigid parts to modify the elongation profile between the coils.

According to a variant, the deformable part of the structure comprises a first fixed rigid part and two other movable rigid parts, one end of which is fixed to said fixed part and the other end of which can be separated, thus allowing the deformation of the deformable part. The elongation profile of the amplifying optical fiber can be tailored by adjustment of the separation between the movable parts and the fixed part.

According to a variant, the rigid parts have half-cylinder shapes, making it possible to form coils of generally circular or elliptical shape.

According to a variant, the amplifier comprising a passive fiber pigtail spliced to the output end of said amplifying optical fiber, the Brillouin spectrum of the amplifying fiber/output fiber pigtail assembly, when it is subjected to a zero tension, comprises at least two peaks, including a main peak corresponding to the Brillouin gain of the amplifying fiber and a peak corresponding to the Brillouin gain of the output fiber pigtail, the peak corresponding to the Brillouin gain of the output fiber pigtail exhibiting a lower frequency than said main peak corresponding to the Brillouin gain of the amplifying fiber. This configuration allows a very good increase in the Brillouin threshold, despite the presence of an output fiber pigtail.

According to a variant, the amplifier comprising a passive fiber pigtail spliced to the output end of said amplifying optical fiber and in which the Brillouin spectrum of the amplifying fiber/output fiber pigtail assembly, when it is subjected to a zero tension, comprises at least two peaks, including a main peak corresponding to the Brillouin gain of the amplifying fiber and a peak corresponding to the Brillouin gain of the output fiber pigtail, the peak corresponding to the Brillouin gain of the output fiber pigtail exhibiting a frequency at least 400 MHz higher than said main peak corresponding to the Brillouin gain of the amplifying fiber.

According to a variant, the amplifier comprises an amplifying optical fiber whose Brillouin spectrum when it is subjected to a zero tension does not exhibit any acoustic secondary peaks.

According to a variant, the amplifying optical fiber and/or the structure are covered with an elastic or polymer material, advantageously forming a layer around the fiber and/or the structure of thickness greater than 500 μm and a modulus of less than 100 MPa. This variant makes it possible to preserve the spatial quality of the beam at the fiber output in the case in particular of matched mode fibers and/or to safeguard the linear polarization state when the amplifying fiber is a polarization-maintaining fiber.

According to a second aspect, the invention relates to an amplified master oscillator system comprising a laser source for emitting a signal beam, a laser source for emitting a pump beam and an optical fiber amplifier according to the first aspect intended to amplify said signal beam, in which said pump beam is coupled to the amplifying optical fiber of the amplifier.

Such an amplified master oscillator system (or MOPA, the abbreviation standing for the expression "Master Oscillator Power Amplifier") can be used for example in a LIDAR system whose performance is all the better as the power generated by the MOPA is large.

According to a variant, the elongation profile of the amplifying optical fiber in the amplified master oscillator system comprises a single local maximum, attained in the vicinity of a given distance from the input end of the amplifying optical fiber, said distance being a fraction x of the length of the amplifying optical fiber determined by minimizing the maximum Brillouin logarithmic gain.

According to a third aspect, the invention relates to a method of manufacture of an amplifier with amplifying fiber comprising:
  the coil of at least one part of said amplifying optical fiber around a deformable part of a structure in the form of coils, said coils being in contact with a surface of said deformable part of the structure,
  the fixing of the amplifying optical fiber to said structure at at least two fixing points,
  the deformation of said deformable part of the structure, causing by rubbing of said amplifying optical fiber on said surface an elongation of said amplifying optical fiber according to an elongation profile varying from one coil to the next.

According to a variant, said amplifier comprising fibered passive optical elements, the method furthermore comprises one or more prior step(s) of splicing to the at least one of the two end(s) of the amplifying optical fiber of said fibered passive optical elements.

According to a variant, the method furthermore comprises:
  the coupling of a signal beam in an input end of said amplifying optical fiber,
  the measurement of the Stokes fluorescence spectrum of the backscattered wave resulting from Brillouin scattering in said amplifying optical fiber, and
  the deformation of said deformable structure as a function of the Stokes fluorescence spectrum.

According to a variant, the elongation profile exhibiting a local maximum, the deformation of said deformable part of the structure comprises the tailoring of the maximum value of the elongation or of the position of the maximum.

BRIEF DESCRIPTION OF THE DRAWINGS

Other advantages and characteristics of the invention will become apparent on reading the description, illustrated by the following figures.

DETAILED DESCRIPTION

Figure 1A:
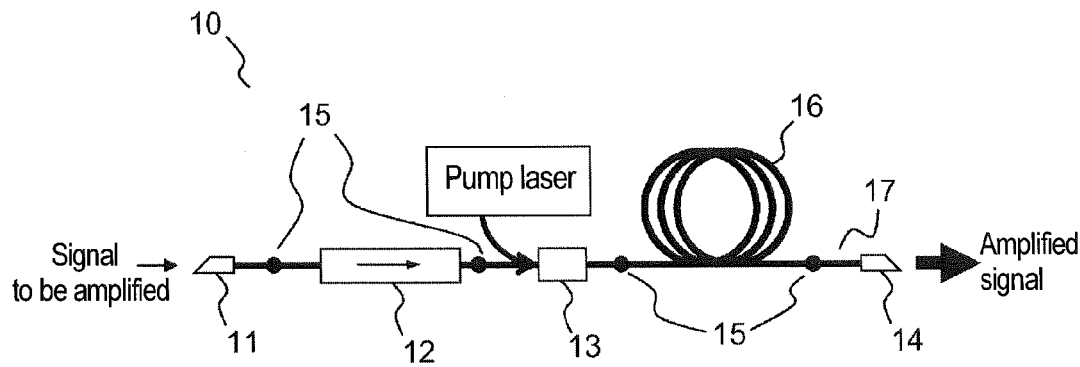
FIGS. 1A and 1B, the diagram of a fiber amplifier according to the prior art adapted for operating respectively in co-propagating and counter-propagating mode (already described)
Figure 1B:
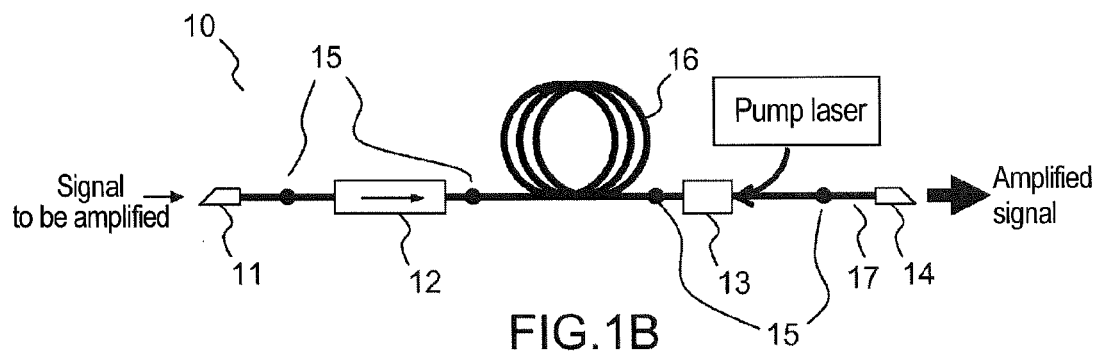
Figure 3A:
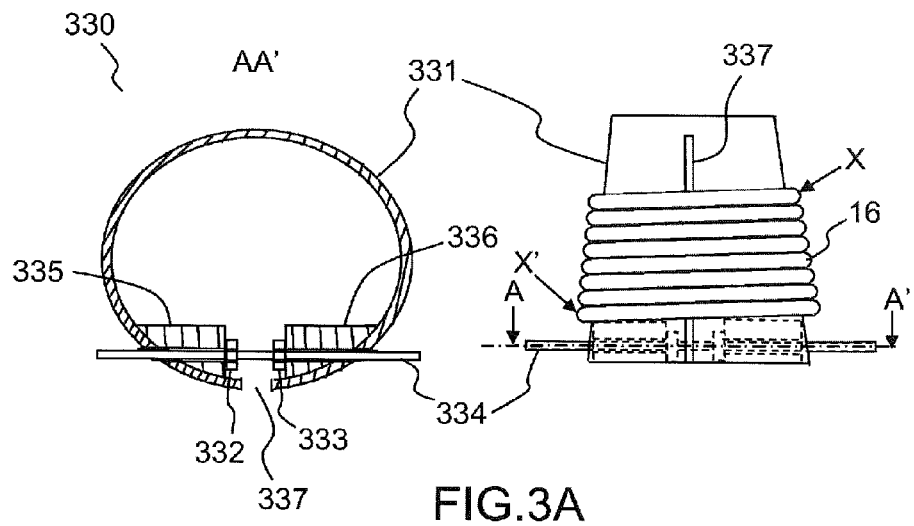
FIGS. 3A and 3B, two examples of deformable structures suitable for an optical fiber amplifier according to the invention.

FIG. 3A illustrates according to a sectional view and a side view an exemplary embodiment of a structure comprising in particular a deformable part 330 suitable for an exemplary embodiment of optical fiber amplifier according to the invention. The amplifier is for example of the type of that described by means of FIGS. 1A and 1B, at least one part of the amplifying fiber 16 being coiled around the deformable structure. The amplifier comprises, in particular, means for coupling a signal beam with an input end of the amplifying optical fiber and means for coupling a pump beam for a co-propagating or counter-propagating pumping. The coupling means can comprise fibered coupling elements, for example connectors. The amplifier can comprise other fibered passive optical elements such as described by means of FIGS. 1A, 1B, of isolator, fiber, etc. type.

The deformable structure 330 comprises a partially split hollow cylinder 331 around which the amplifying optical fiber 16 is coiled. The deformation of the structure is obtained by the separation of the two edges of the slot 337, for example by means of a traversing threaded pin 334 and of two wedges 335, 336 fastened to 330 and through which the pin 334 passes. Adjustment nuts 332, 333 make it possible to separate the wedges from one another and consequently to deform the cylinder. Alternatively, the structure can comprise two hollow half-cylinders fixed at one of their ends and a mechanism making it possible to separate the two half-cylinders at the other end. The cylinder or the half-cylinders are made of sufficiently rigid material for the deformation of the cylinder to be able to be transmitted to the fiber. In particular, the bigger the diameter of the fibers, the more rigid the structure must be, the rigidity depending on the quadratic moment of the structure and the Young's modulus of the material. Thus in the example of FIG. 3A, a cylinder made of polyvinyl chloride (PVC) of thickness greater than 2 mm may suffice for optical fibers of less than 125 μm in diameter. Other materials can be used. For example a structure made of aluminum of thickness greater than 500 μm. The structure when it is deformed thus communicates an elongation to each coil which can vary from 0 where the edges of the slot are held (point denoted X in FIG. 3A) to a value $\delta X_{max}$ at the point where the edges are furthest separated (point denoted X' in FIG. 3A). The frictional rubbing between the fiber and the external surface of the cylinder makes it possible to reduce the coupling between several successive coils. The coefficient of friction between the fiber and the external surface of the cylinder increases as the cylinder is deformed by squashing of the external polymer coating of the fiber. For a standard surface quality, the applicant has shown that a coefficient of friction between the external coating and the cylinder at low tension between typically 0.05-0.25 was sufficient for the effect sought. It is thus possible to obtain by deformation of the structure an elongation profile $\epsilon$ varying from one coil to the next. The elongation $\epsilon(z)$ for a fiber portion situated at z of rest length l and of length l+dl after elongation is defined by $\epsilon(z)=dl/l$. The elongation $\epsilon$ varying from one coil to the next translates into a shift of the Brillouin gain spectrum from one coil to the next by a quantity $\Delta\nu$. The coefficient $K=\Delta\nu/\epsilon$ depends on the fiber considered. For an incident optical signal of wavelength 1545 nm, K is in general between 400 and 550 MHz/% of elongation. The variation of the shift of a coil has made it possible to increase the Brillouin threshold by reducing the effective length for which the Brillouin gain at a given frequency accumulates.

The manufacture of an optical fiber amplifier by means of a deformable structure described for example by means of FIG. 3A advantageously comprises the coiling of the amplifying optical fiber 16 or of at least one part of said fiber around the deformable structure so as to form coils in contact with a surface of the deformable structure, that is to say in the example of FIG. 3A, the external surface of the partially split cylinder 331 or of the half-cylinders. The amplifying optical fiber 16 can thereafter be fixed to the structure at the fixing points X and X' of the structure. The deformation of the structure then causes by frictional rubbing of the amplifying optical fiber on the external surface of the structure an elongation of the fiber according to an elongation profile varying from one coil to the next. Advantageously, when other fibered elements are provided for in the amplifier, like optical coupling elements or other passive fibered elements such as the isolator 12, the connector 14 and the output fiber pigtail 17 (FIGS. 1A, 1B), provision may be made to undertake firstly the splicing of the various elements to the amplifying optical fiber and then its coiling around the deformable structure. As will be described in greater detail in the subsequent description, it is thus possible to undertake adjustments of the elongation of the amplifying fiber and therefore of the Brillouin gain in the phases of testing the complete optical fiber amplifier, that is to say equipped with the coupling devices and other elements intended to be spliced to the amplifying optical fiber, these elements being able to influence the spectral shape of the Brillouin gain. Moreover, it is not necessary to leave fiber lengths unstrained with a view to the subsequent splicing with the various elements, thereby reducing, in particular at the output of the amplifying optical fiber, the risk of increasing the Brillouin gain.

In the example of FIG. 3A, there is however a limit to the maximum elongation $\delta X_{max}$ due to delamination phenomena. Indeed, when the fiber, generally composed of a coating made of polymer material and of a part made of glass (for example silica), is attached to the structure at a point, contact is made by the polymer which may be glued or stuck strongly to the structure. While the fiber is being strained, a shear field may result at the level of the attachment point from the large variation between the displacement field of the glass part of the fiber (which moves) and the displacement field of the polymer coating (which is held stationary). When the shear at the silica/polymer interface becomes comparable to the force of cohesion of this interface, the polymer may become detached. One speaks of delamination. The same situation can occur at the polymer/glue interface. Moreover, in the case of a so-called double-clad fiber for which the pump beam propagates in the guide formed by the glass internal pump cladding and the polymer coating acting as an outer cladding of lower index, the pump beam may undergo scattering due to the irregularities of the delaminated interface. The pump beam may then penetrate into the polymer which absorbs it and heats up until the destruction thereof.

To reduce the risk of delamination and allow bigger maximum elongations of the fiber, it is advantageous to fix the fiber to the structure at fixing points for which the elongation of the fiber is small, so as to reduce the shear field at the level of the attachment point. The fiber may be fixed to a fixed part of the structure or to the deformable part of the structure, at points where the elongation is small By taking an acceptable maximum value of 200 MPa for the shear that can be supported by the adhesion layer between the polymer of the coating and the silica part of the fiber and a Young's modulus of the fiber taken equal to that of silica i.e. of the order of 70 GPa, we obtain a maximum elongation of the order of 0.3% to be applied to the fiber at the level of the attachment point in order to reduce the risk of delamination.

Such a configuration is possible in the example of FIG. 3A by providing at the level of the point X' where the elongation of the fiber is a maximum a return device (not represented) so that the fiber goes back in the reverse direction along its initial path toward the point X. Thus, the amplifying fiber will be fixed to the deformable structure at fixing points close to the point X of minimum elongation.

Figure 3B:
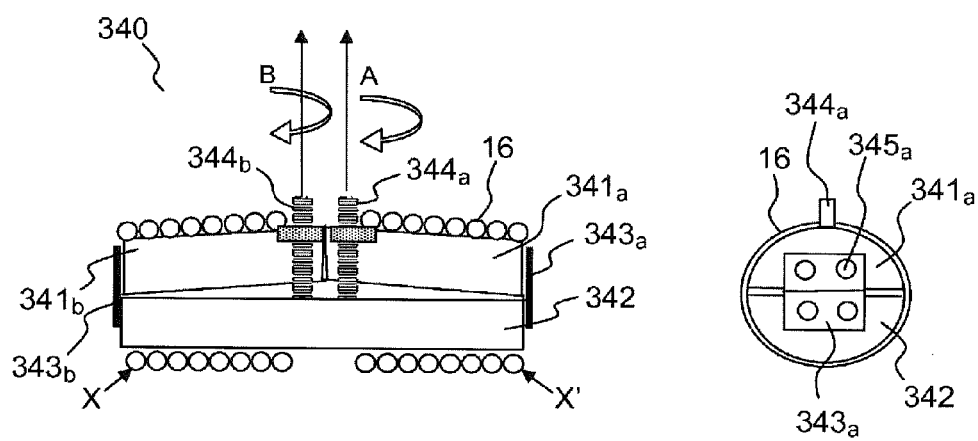

FIG. 3B presents a variant for a deformable structure suitable for the production of an optical fiber amplifier with high Brillouin threshold making it possible to reduce the risk of delamination. In the example of FIG. 3B, the structure comprises a deformable part 340 comprising three rigid parts 341a, 341b, 342, for example in the form of half-cylinders, including a fixed rigid part (the part referenced 342) and two shorter, movable, parts 341a and 341b, fixed by one of their ends to the ends of the fixed part 342, for example by means of hinges 343a, 343b. The other two ends of the parts 341a and 341b can be separated from the fixed part 342 by means of a separation mechanism. For example, in the example of FIG. 3B, the separation mechanism comprises for each bit 341a, 341b, a threaded-rod system rotating in a nut fastened to the part that it is sought to separate, and denoted respectively 344a and 344b in FIG. 3B. The rotation indicated by the arrows A and B of the separation mechanisms 344a and 344b allows the translation of the nuts along the threaded rod and the separation of the rigid parts 341a, 341b, resulting in a maximum deformation of the deformable part of the structure 340 at its center. Thus, the distance between 341a and 342 on the one hand and between 341b and 342 on the other hand varies along the part 342, attaining a maximum at the level of the separation mechanisms 344a, 344b while guaranteeing a zero or near-zero elongation at the ends where the fiber is attached.

The method of manufacture of an amplifier with high Brillouin threshold by means of the deformable structure 340 such as described in FIG. 3B is substantially the same as that described previously. The various coupling elements or other possible fibered passive optical elements are firstly spliced to the amplifying optical fiber. The separation mechanisms are adjusted to the minimum separation level. The amplifying optical fiber 16 is coiled around the deformable structure to form coils in contact with the exterior surfaces of the parts 341a, 341b, 342, forming for example each of the half-cylinders, the coils then being of circular or elliptical shape. The amplifying optical fiber is fixed to the structure at the fixing points X and X', for example by an adhesive, the fixing points being situated at the ends of the parts 341a, 341b close to the hinges 343a, 343b where the deformation remains a minimum. Alternatively, the fixing points X and X' can be situated on a fixed frame (not represented in FIG. 3B) of the structure. Rotations A and B can then be performed so as to separate the other two ends of the parts 341a, 342b of the fixed part 342, causing an elongation of the amplifying optical fiber with an elongation profile exhibiting a local maximum in the central region and a minimum elongation at the ends. Once the adjustment has terminated, the fiber can be immobilized, for example by gluing, by a resin, or by an appropriate device holding the fiber in position by compression.

As previously, the rigidity of the parts 341a, 341b, 342 forming the structure must be sufficient to ensure that the deformation of the latter under the effect of the restoring force exerted by the amplifying optical fiber when the parts of the structure are separated is negligible compared with the value of the separation sought. In the converse case indeed, there is a risk of saturation of the relative elongation of the optical fiber during the deformation of the structure, the restoring force being in the opposite direction to that of the separation force. It may be shown that the bigger the diameter of the fiber, the more rigid the structure must be, the rigidity of each part depending on its quadratic moment and on the Young's modulus of the material of which it is composed.

Moreover, it will be possible to choose a coefficient of friction between the external coating of the amplifying optical fiber and the surface of the deformable part of the structure around which the fiber is coiled sufficient for, even at low tension, the deformation between two coils to be hardly coupled, thereby making it possible to obtain a non-uniform elongation profile, but not too high to obtain an averaging effect for the elongation on the scale of a half-coil. Typically, the applicant has shown that for a standard surface quality, a coefficient of friction of strictly greater than 0, advantageously greater than 0.05 was appropriate; advantageously, it will be chosen less than 0.25.

As explained previously, an advantage of the deformable structure 340 represented in FIG. 3B is in particular that it exhibits good resistance to delamination, the fixing points being situated at points of the amplifying optical fiber for which the elongation remains a minimum.

Figure 4:
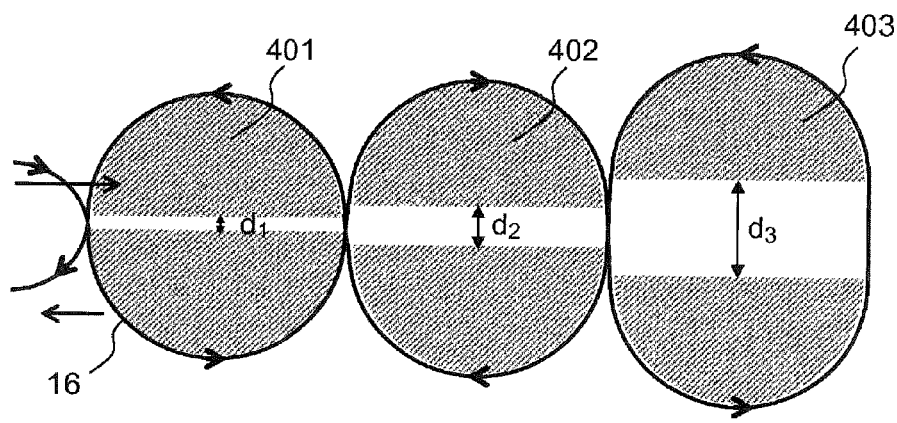
FIG. 4, another example of a deformable structure suitable for an optical fiber amplifier according to the invention.

Of course, the invention is not limited to the particular examples represented in FIGS. 3A and 3B. Other structures are possible, which exhibit a deformable part around which the amplifying optical fiber can be wound in the form of coils, the coils being in contact with a surface of the deformable part. For example, FIG. 4 illustrates according to a sectional view an exemplary structure comprising a deformable part formed of several elements 401, 402, 403 defining a surface around which the amplifying optical fiber is coiled. In the view of FIG. 4, the direction of coiling of the fiber is represented by arrows. Each element comprises for example a screw/nut assembly allowing the separation of the two half-cylinders of which it is composed, the distances $d_1$, $d_2$, $d_3$ indicating the separation between the parts of each of the elements. Such a structure exhibits in particular the advantage, for identical bulk volume, of limiting the height of the complete structure.

Generally, the applicant has shown that an elongation profile of the amplifying optical fiber with elongation values that are zero or near-zero at the ends of the fiber, or more generally are less than the limit beyond which there is a risk of delamination, and a local elongation maximum was particularly beneficial since it represents a good compromise between the usual length of the amplifying optical fiber (typically between 2 m and 10 m), the maximum diameter sought for the deformable structure (about 20 cm), and robustness to delamination. In the case of a very long fiber (length greater than 5 m typically), an elongation profile with a single local maximum would lead to a smaller elongation gradient since the maximum elongation in the amplifying optical fiber is limited by various factors (for example the lifetime of the fiber). A sawtooth profile with several local extrema may turn out to be advantageous in this case. Such a profile moreover presents the advantage of being readily implemented with a deformable structure of the type of that described by means of the previous examples (FIGS. 3A, 3B and 4).

More precisely, the applicant has shown that it was possible to optimize the elongation profile as a function of various parameters, including for example the type of pumping. To study the optimal profiles of the elongation of the fiber in co-propagating or counter-propagating configurations in a fiber amplifier according to the invention, the behavior of diverse amplifiers is modeled.

Figure 2:
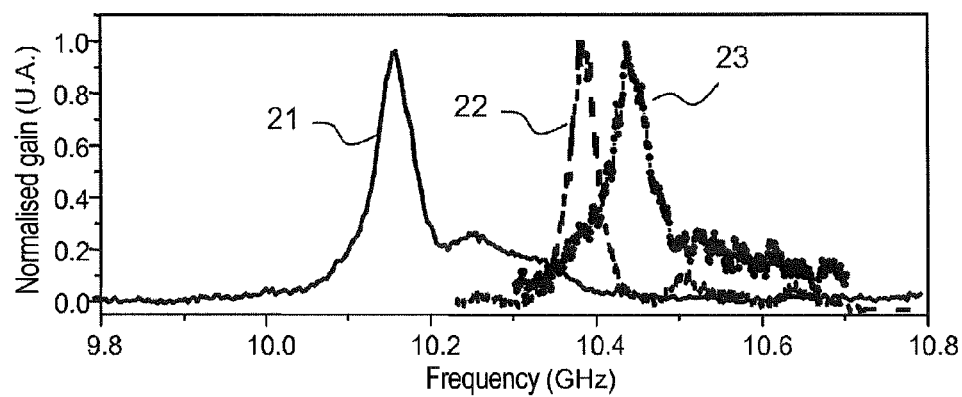
FIG. 2, experimental curves illustrating the spectral shape of the Brillouin gain in three commercial optical fibers (already described)

As is apparent in FIG. 2 already described, the spectral shape of the Brillouin gain may vary for fibers of the same nature, in this example Erbium Ytterbium doped fibers, but originating from various manufacturers. Furthermore, the shift Δu undergone by the Brillouin gain peaks when an optical fiber segment is subjected to a given elongation c is proportional to this elongation with a coefficient of proportionality K which depends on the fiber, its composition and the wavelength.

Table 2 hereinbelow thus illustrates values of the coefficient $K=\Delta v/\epsilon$ measured at 1543 nm for various off-the-shelf fibers, the fibers B, C, D, E, F being amplifying optical fibers and the fiber A a passive optical fiber F-PM1550 from Newport®.

TABLE 2

| Fiber | Dopants | Core diameter (μm) | Numerical aperture | Brillouin Frequency of the main peak $v_B$ (GHz) | Coefficient $K = \Delta v/\epsilon$ (MHz/% elongation) | Spectral width at 3 dB (MHz) |
|---|---|---|---|---|---|---|
| A | Undoped | | | 10.89 | 540 | 27 |
| B | Er, Yb | 6.3 | 0.16 | 10.31 | 412 | 50 |
| C | Er, Yb | 20 | 0.14 | 10.46 | 467 | 48 |
| D | Er | 20 | 0.14 | 11.39 | 517 | |
| E | Er, Yb | 18 | 0.18 | 10.19 | | 57 |
| F | Er, Yb | 12 | 0.17 | 10.22 | 420 | 47 |

Among the amplifying optical fibers cataloged in table 2, the spectral shapes of the Brillouin gain of fibers B, C and E have already been described by means of FIG. 2.

Figure 11A:
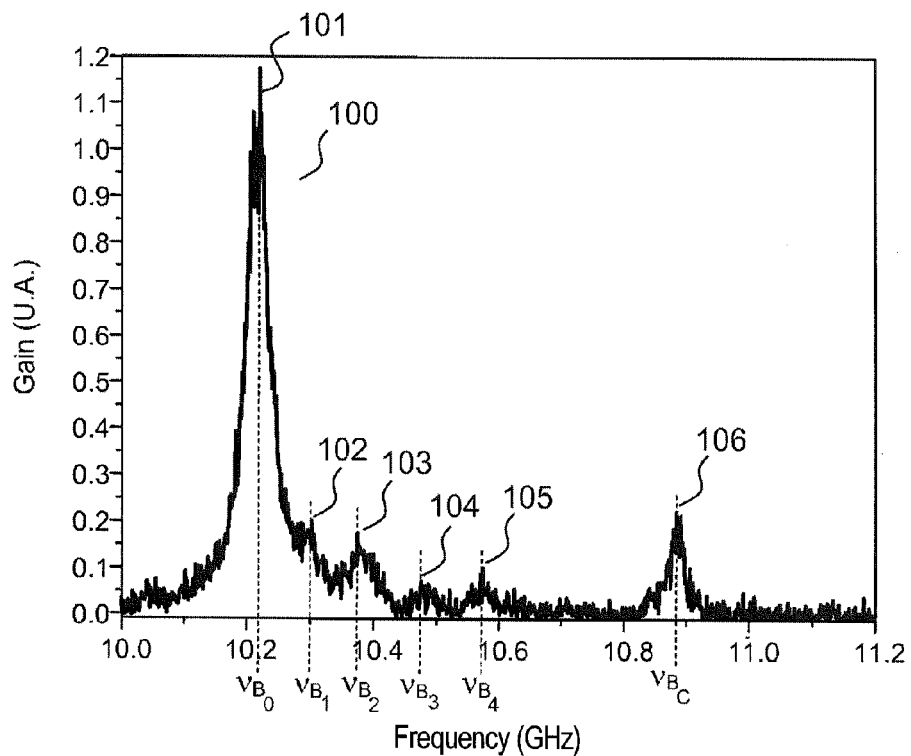
FIGS. 11A and 11B, the spectral shape of the Brillouin gain of amplifying optical fibers spliced to passive fibers adapted for the production of a fiber amplifier, according to two exemplary embodiments.
Figure 11B:
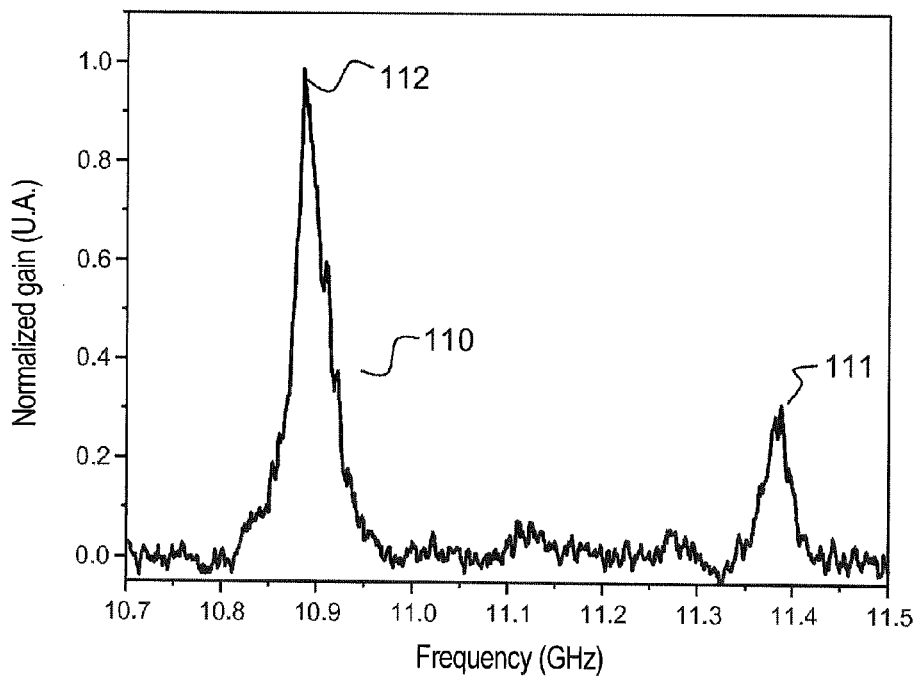

The experimental curve 100 of FIG. 11A represents the spectral shape of the Brillouin gain of the fiber referenced F in table 2, Ytterbium Erbium doped, exhibiting a core diameter of 11 μm and a numerical aperture of 0.18, to the input of which is spliced a passive fiber A of length 2 m. To the output of the fiber F is also spliced a fiber A of length 20 cm. The experimental curve 110 of FIG. 11B represents the spectral shape of the Brillouin gain of the fiber referenced D in table 2 to the output end of which is spliced an output fiber pigtail made of passive fiber of type A of length 20 cm.

For the modeling, we consider an amplifying optical fiber of length L in which most of the optical power circulates in the fundamental mode of effective area $A_{eff}$ and exhibiting a power distribution P(z) varying as a function of the position z on the fiber, where $0 \leq z \leq L$.

The power P(z) is generated by a total gain $G_A$ resulting from an amplification other than Brillouin. One may for example be dealing with a Raman amplifier or a doped-fiber amplifier. For a given amplifier, the profile P(z) which describes the signal power at the position z along the fiber is calculated by using a fiber amplifier simulator. Such an example of a simulator is described for example in the publication Y. Wang and Hong Po, "Dynamic characteristics of double-clad fiber amplifiers for high-power pulse amplification," J. Lightwave Technol. 21, 2262-2270 (2003) for the case of Ytterbium-doped fiber amplifiers and in the publication G. Canat, J.-C. Mollier, J.-P. Bouzinac, G. M. Williams, B. Cole, L. Goldberg, Y. Jaouën, and G. Kulcsar, "Dynamics of high-power erbium-ytterbium fiber amplifiers," J Opt. Soc. Am. B 22, 2308-2318 (2005) for Erbium-Ytterbium-doped fiber amplifiers.

We call $g_B(f)$ the Brillouin gain at the frequency f of the strain free fiber (that is to say with no tension), $f_{max}$ the frequency at which $g_B(f)$ attains its maximum and $g_B(f,z)$ the Brillouin gain at the frequency f of a small segment situated at the position z and liable to be subjected to an elongations responsible for a shift of the spectrum. It is shown that:

$$g_B(f,z) = g_B(f - K\epsilon(z)) \tag{1}$$

The noise photons present in the Stokes wave at the frequency f are moreover amplified by a factor $G(f) = G_A \cdot \exp \gamma_{B,eff}(f)$ with:

$$\gamma_{B,eff}(f) = \frac{\int_0^L g_B(f,z) P(z) dz}{A_{eff}} \tag{2}$$

Where $\gamma_{B,eff}$ is the logarithmic gain caused by Brillouin amplification at the frequency f.

The Brillouin threshold is defined by the power obtained at the fiber output when about 10% of the incident power is backscattered. It is attained when the maximum Brillouin logarithmic gain $\gamma^{max}_{B,eff}$ satisfies the following condition:

$$\gamma^{max}_{B,eff} = \max_f \gamma_{B,eff}(f) = K_B - \ln G_A \tag{3}$$

where $K_B$ is close to 18.

It is shown that if the fiber is strain free, an expression for the Brillouin logarithmic gain $\gamma_{B,eff}$ is given by:

$$\gamma_{B,eff}(f) = \frac{g_B(f_{max}) P(L)}{A_{eff}} L_{eff} \tag{4}$$

$$\text{where } L_{eff} = \frac{1}{P(L)} \int_0^L P(z) dz$$

is the so-called effective length of the amplifier, and P(L) is the power at the fiber output.

In the case where the fiber is subjected to a monotonic strain $\epsilon(z)$, it is shown that, under certain conditions, equation (3) results in an expression for the Brillouin logarithmic gain according to the equation hereinbelow:

$$\gamma_{B,\mathit{eff}}(f) = \frac{g_B(f_{max})P(z(f))}{A_{\mathit{eff}}} \frac{\pi B}{2} \left|\frac{dz}{d\Delta\nu}\right|(f) \qquad (5)$$

Where z(f) is the reciprocal function of the frequency shift distribution $\Delta\upsilon(z)$ and B is the spectral width of the Brillouin gain of the strain free fiber. If $\epsilon(z)$ is not monotonic, it suffices to sum the expression (5) with for z(f) the various possible reciprocal functions.

By comparing (4) and (5), it is seen that if $\Delta\nu(z)$ varies by a value larger than B over a short scale relative to the effective fiber length $L_{\mathit{eff}}$, the maximum value of $\gamma_{B,\mathit{eff}}$ will be reduced with respect to a strain free fiber. To obtain an increase in the Brillouin threshold by means of the elongation, it is therefore advantageous to have a fast variation of the elongation, in particular in the zone of the fiber where the power is a maximum. More precisely, in order to minimize $\gamma_{B,\mathit{eff}}^{max}$, the applicant has shown that it was beneficial to seek an elongation profile such that $$\frac{d\Delta\nu}{dz}$$

is proportional to P(z), apart from the sign, that is to say an elongation profile such that the z-derivative of the elongation c(z), taken as absolute value, is proportional to P(z).

In practice it is difficult to implement such a profile strictly. It is however possible to approximate it by choosing $\epsilon(z)$ piecewise linear. For example an elongation profile $\epsilon_x(z)$ which varies in a triangular manner:

$$\varepsilon_x(z) = \begin{cases} \frac{z}{xL}\varepsilon_{max} & \text{if } z \leq xL \\ (L-z)/(L-xL) \cdot \varepsilon_{max} & \text{if } z > xL \end{cases} \qquad (6)$$

For a given power P(z) and a given maximum elongation, it is then possible to determine the position of the maximum elongation over the fiber, this position being given by xL, where $0 \leq x \leq 1$. The determination of xL can be done by numerical optimization so as to render $\gamma_{B,\mathit{eff}}^{max}$ as small as possible. The Brillouin logarithmic gain $\gamma_{B,\mathit{eff}}(f)$ to be minimized is calculated by means of equations (1) and (2).

The optimization then consists in choosing the parameter x of the profile $\epsilon_x(z)$ (equation (6)) for a given constant maximum elongation $\epsilon_{max}$ and a given optical power distribution P(z) which minimizes the following expression (7) deduced from equations (1) and (2):

$$\gamma_{B,\mathit{eff}}^{max}(x) = \max_f \cdot \frac{\int_0^L g_B(f - K\varepsilon_x(z))P(z)\,dz}{A_{\mathit{eff}}} \qquad (7)$$

It is recalled that in this equation L is the length of the optical fiber, $g_B$ is the effective Brillouin gain of a strain free fiber portion, K is the coefficient of proportionality between the frequency shift and the stretch, P(z) is the optical signal power at the position z and $A_{\mathit{eff}}$ is the effective area of the optical mode. The above equations make it possible to highlight specific advantageous elongation profiles in the case of amplifiers in co-propagating or counter-propagating configuration. For a given amplifier, the profile P(z) which describes the signal power at the position z along the fiber is calculated using a fiber amplifier simulator.

Figure 5:
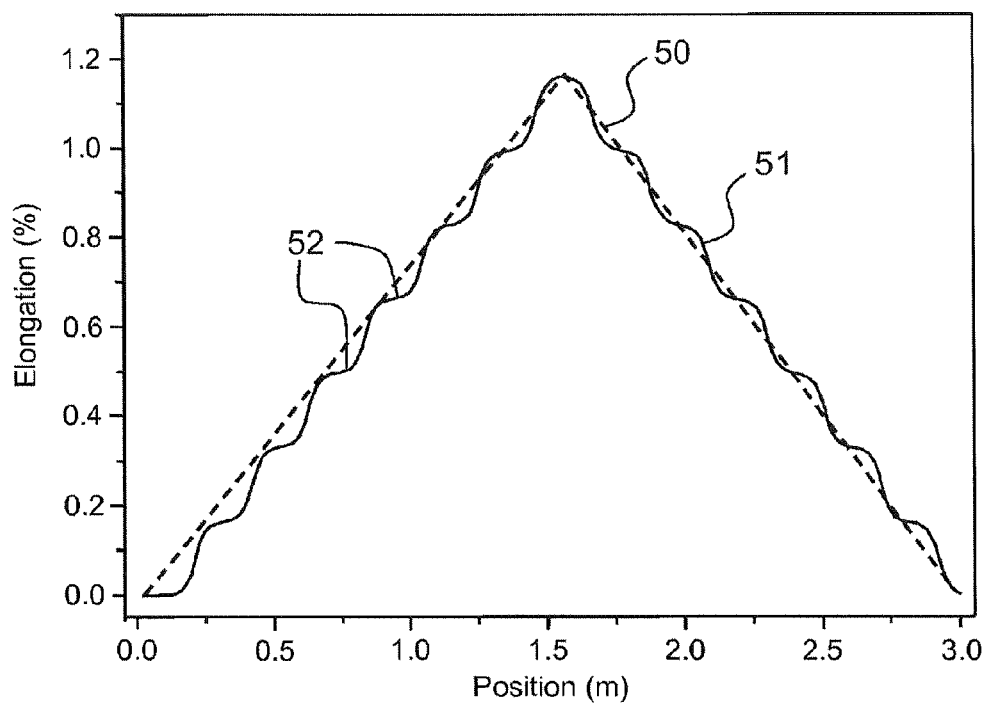
FIG. 5, an exemplary profile of the elongation of the amplifying fiber according to a variant.

More precisely, the applicant has shown that in co-propagating pumping in the pump clad, it may be advantageous to seek a triangular shape elongation profile, exhibiting a local maximum substantially in the middle of the fiber. An example of such an elongation profile $\epsilon(z)$ is represented in FIG. 5 (curve 50) for a fiber of 3 m. Curve 51 represents an elongation profile of this type, obtained when the friction of the amplifying optical fiber on the surface of the deformable part of the structure is bigger, causing plateaus 52 corresponding to a near-constant elongation on each of the half-coils. Such an elongation profile may be obtained with a deformable structure of the type of FIG. 3B by employing two parts 341a and 341b of substantially the same length and by coiling the amplifying optical fiber around the structure in a regular manner, in such a way that the number of coils on either side of the local maximum is substantially identical.

Figure 6A:
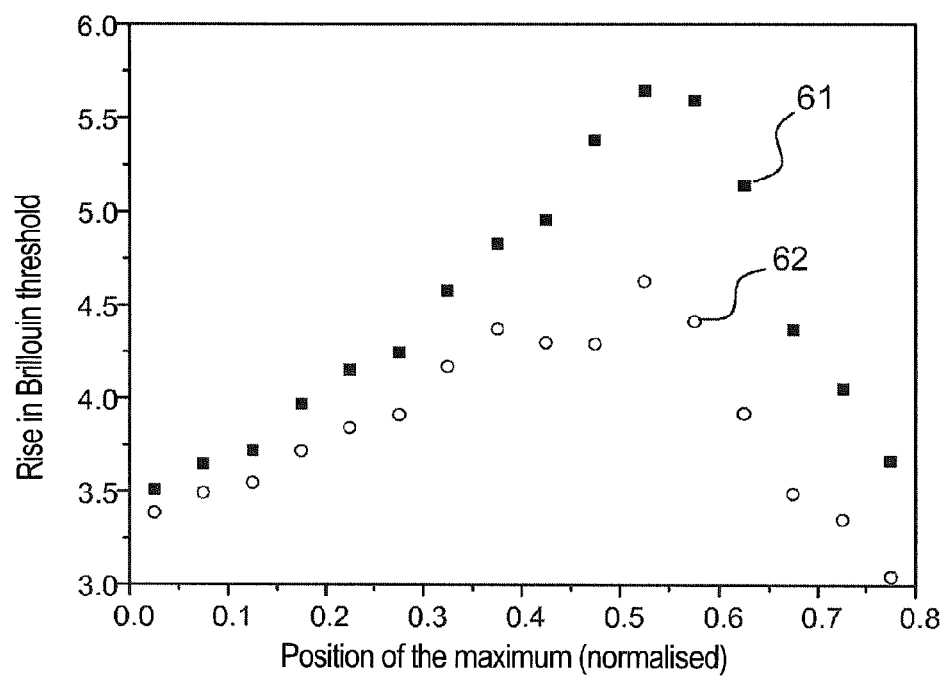
FIGS. 6A and 6B, curves obtained by numerical simulation showing in an amplifying optical fiber exhibiting a Brillouin gain of the type of that illustrated in FIG. 11A, the rise in the Brillouin threshold as a function of the position of the local maximum of the elongation, respectively in co-propagating and counter-propagating configuration, for an optical power of the signal propagating in the fiber illustrated respectively in the figure curves 67 and 68 of FIG. 6C and FIG. 6C, curves of optical power of the signal as a function of position in the fiber.
Figure 6B:
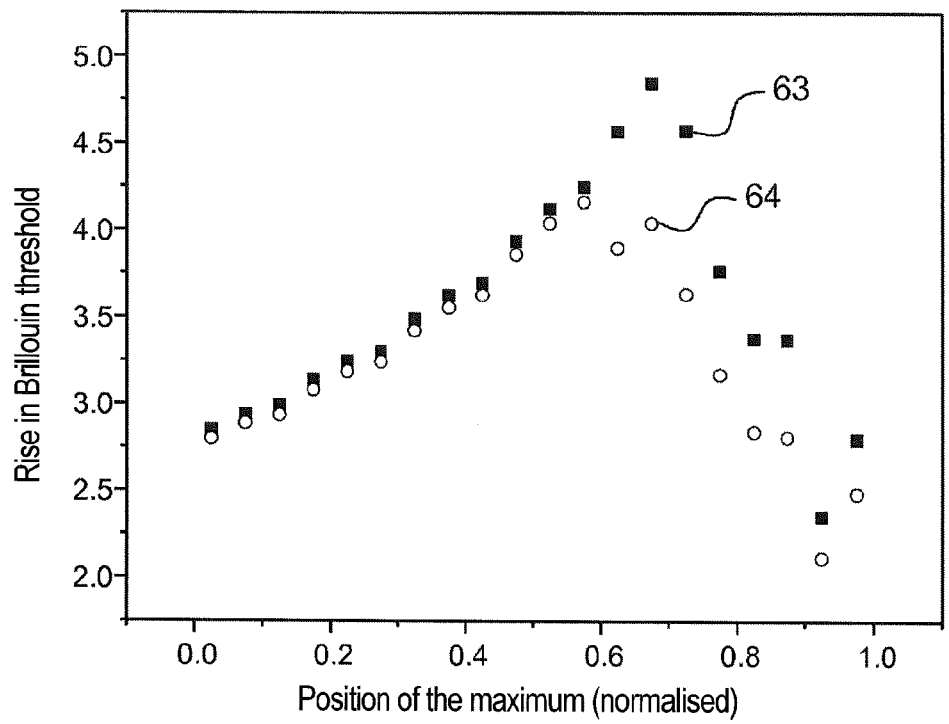
Figure 6C:
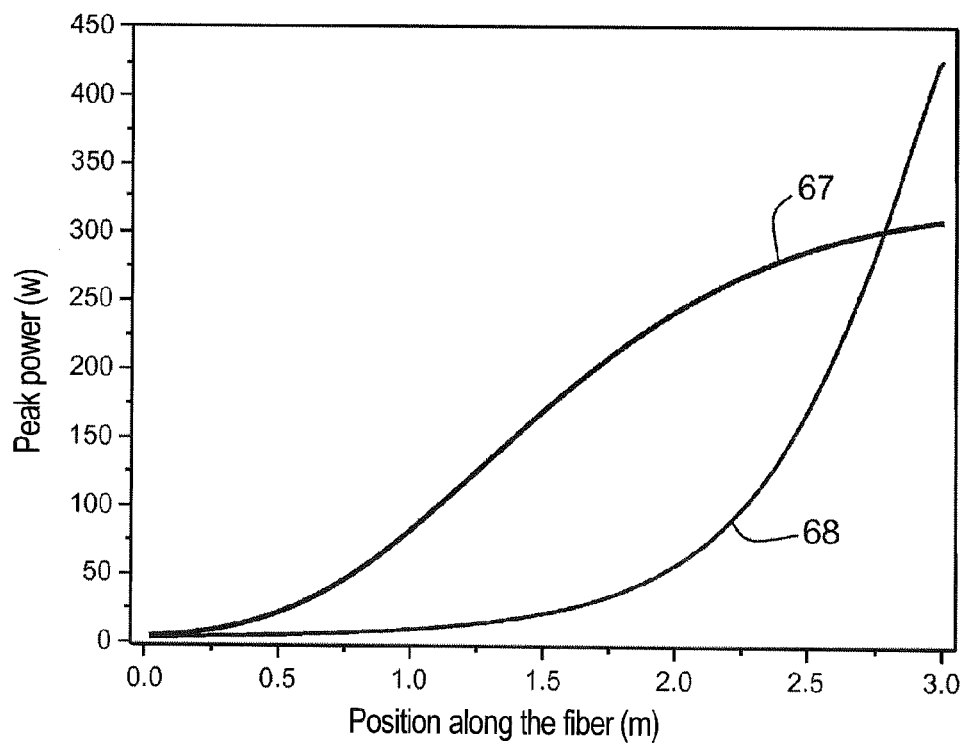

Thus, FIG. 6A represents a simulation of the rise in the Brillouin threshold as a function of the normalized position of the elongation maximum, in co-propagating mode, with an optical power profile P(z) corresponding to a co-propagating pumping in the pump clad and represented on curve 67 of FIG. 6C. By parametrizing the position of the maximum of the profile by a fraction x of the length of the fiber such that $0<x<1$, it is shown that the optimum of the position of the maximum satisfies $0.4<x<0.6$. The optimization then consists in varying the parameter x which parametrizes the profile (6) introduced into equations (1) and (2) for a constant maximum elongation and a given profile P(z) and in minimizing the value of the maximum Brillouin parameter $\gamma_{B,\mathit{eff}}^{max}(x)$. Curve 62 is calculated with an amplifying optical fiber for which a shape of the Brillouin gain is represented on the curve referenced 100 in FIG. 11A. Curve 61 is obtained with an identical fiber but without the secondary peaks (only the peak 101 is taken into account in the simulation). In both cases, an optimum of positioning of the elongation maximum is observed between 0.4 and 0.6.

FIG. 6B represents a simulation of the Brillouin threshold rise obtained under the same conditions as those of FIG. 6A but for a given profile P(z) corresponding to a counter-propagating pumping and illustrated in curve 68 of FIG. 6C. Curves 63 and 64 calculated respectively without taking account of the secondary peaks (curve 63) and by taking into account the secondary peaks (curve 64) show that the optimum of positioning of the maximum corresponds to $0.5<x<0.9$ in the presence or in the absence of secondary peaks. Indeed, within the framework of a pumped fiber amplifier in a counter-propagating configuration, the shape of P(z) approximates an exponential and therefore, the contribution of the fiber regions situated toward the output of the amplifier where the power is the largest is bigger than that of the regions situated at the fiber input. Thus, in counter-propagating mode, the applicant has shown that it was advantageous to shift the local maximum toward the output end of the fiber for the rise in the Brillouin threshold. The optimization then consists in varying the parameter x which parametrizes the profile (6) in equations (1) and (2) for a constant maximum elongation and a given profile P(z) and in minimizing the value of the maximum Brillouin parameter $\gamma_{B,\mathit{eff}}^{max}(x)$. Such an elongation profile may be also obtained with a deformable structure of the type of FIG. 3B by employing two parts 341a and 341b of substantially the same length and by coiling the amplifying optical fiber around the structure but with a variable spacing between the coils, in such a way that the number of coils on the fiber input side before the point of the fiber undergoing the local elongation maximum is less than the number of coils on the fiber output side after the point of the fiber undergoing the local elongation maximum.

The positions given hereinabove of the optima can of course be recalculated for different power distributions P(z) or for elongation profiles with several maxima. In particular, it is apparent that within the framework of a pumped optical fiber in a co-propagating configuration in the core, the distribution of P(z) follows a more exponential shape. The optimal profile is therefore here again characterized by 0.5<x<0.9.

In order to better approximate the condition according to which $$\frac{d\Delta v}{dz}$$

is proportional to P(z), apart from the sign, it is also possible to generalize the profile Δv(z) to a larger number of pieces. This case is in particular beneficial if the power varies more quickly along the fiber than Δv(z) in particular in the case of long fibers (more than 10 m). In this case, the position of the extrema of the profile Δv(z) will be chosen so that the length of the piece of fiber separating them decreases (or is constant) on moving toward the output end of the amplifier.

It is also possible to generalize to profiles consisting of pieces of functions of higher slope than affine functions on each piece. Such are for example profiles which would include piecewise parabolic or exponential functions. It is for example possible to implement such profiles with the device represented in FIG. 3B by coiling the optical fiber around the parts 341a, 341b, 342 so that the gap separating the coils is strictly increasing. It is also possible to choose bits 341a, 341b and 342 whose radius is not longitudinally constant.

In addition to the adaptation of the types of elongation profiles of the amplifying optical fiber resulting from the numerical optimization described above, it is advantageous to use a device which allows a modification in the course of a phase of testing the maximum elongation and slopes so as to take account of the non-ideal character of the modeling. The present invention allows this optimization.

As mentioned previously, an advantage of the device and of the method according to the invention is in particular the possibility of being able to tailor the elongation profile of the amplifying optical fiber and therefore the spectral shape of the Brillouin gain during the phases of fine tuning the fibered amplifier. Optical fiber amplifiers with low spectral width are indeed generally small or medium production runs in which for each set of specifications, it is necessary to tailor the fiber lengths, the pump power and the other parameters as a function of the parameters of the fiber. In particular, the elongation profile to be applied may depend on various parameters, including the nature of the amplifying optical fiber, the presence of an output fiber pigtail, and the longevity sought for the fiber. In the case of an elongation profile exhibiting a local maximum and, at the ends, zero or very small elongations, the tailoring may consist simply in adjusting the local elongation maximum, for example by means of the mechanisms for separating the structures previously described. The possibility of tailoring the maximum elongation during the test phases makes it possible to resolve a drawback of the techniques using a coiling according to a tension profile fixed a priori. Indeed these techniques assume diverse prior calibration, and in particular that of the coefficient K=Δv/ε and of the spectral width of the curve of the Brillouin gain of the fiber, and which as seen in table 2, vary appreciably even for a given composition of the fiber (Erbium Ytterbium or Erbium for example).

In addition to the variation of the coefficient K which is noted for various fibers, spectral shapes of the Brillouin gain which differ from the theoretical shape of the lorentzian and which it is also advantageous to take into account when tailoring the elongation profile are observed from one fiber to the next. It is thus observed in FIG. 11A that the spectrum of the Brillouin gain of the amplifying optical fiber F does not exhibit a pure lorentzian shape but comprises several peaks whose individual shape is lorentzian. In particular in FIG. 11A, we observe a main peak 101 of Brillouin frequency $v_{B0}$ and secondary peaks 102 to 105 of Brillouin frequencies $v_{B1}$ to $v_{B4}$ corresponding to several acoustic modes which have an appreciable overlap with the optical mode. The zones of the fiber that are subjected to an elongation see all the peaks of their Brillouin spectrum shifted toward the large frequencies. If two zones of the fiber subjected to different elongations are considered, different frequency shifts, for example $\Delta v_1$ and $\Delta v_2$ respectively, are observed. A Stokes wave measured at the frequency resulting from the sum of the Brillouin frequency of the main peak $v_{B0}$ and of the shift $\Delta v_1$ will thus be able to be amplified in the second zone if there exists a secondary peak at the frequency $v_{B1}$ such that $v_{B0}+\Delta v_1 \sim v_{B1}+\Delta v_2$ to within $\Delta v_B$. It follows from this that the increase in the Brillouin threshold for a given strain gradient will be smaller in a fiber whose Brillouin gain spectrum, measured when the fiber is under zero tension, comprises several peaks.

Another element which may be taken into account when tailoring the elongation profile during the phases of testing the optical fiber amplifier is the presence of an output fiber pigtail made of passive fiber due to the presence either of an output connector or of a fibered component such as an isolator for example. The output fiber pigtail made of passive fiber arranged at the output end of the amplifying optical fiber generates a Stokes wave at a given frequency $v_{B_c}$ and creates an additional peak in the spectrum of the Brillouin gain. Thus in FIG. 11A, the peak 106 corresponds to the presence of a pigtail made of fiber A at the end of the doped fiber F. As previously, the Stokes wave generated by the output fiber pigtail will also be able to be amplified in certain zones of the amplifier if the Brillouin shift $\Delta v_2$ of these zones is such that $v_{B2}+\Delta v_2 = v_{Bc}$. Let us consider for example, the case of a piece of fiber C whose main peak is situated at $v_{B0} \sim 10.42$ GHz. This same fiber subjected to an elongation of the fiber at 1% of elongation induces a Stokes peak at 10.89 GHz which is close to the value for a standard single-mode fiber (fiber A for example). When 1% of elongation is attained, the rise in the Brillouin threshold of an amplifier constructed on the basis of this amplifying fiber and of a length $L_{pigtail}$ of passive fiber will therefore saturate or indeed decrease.

Figure 12:
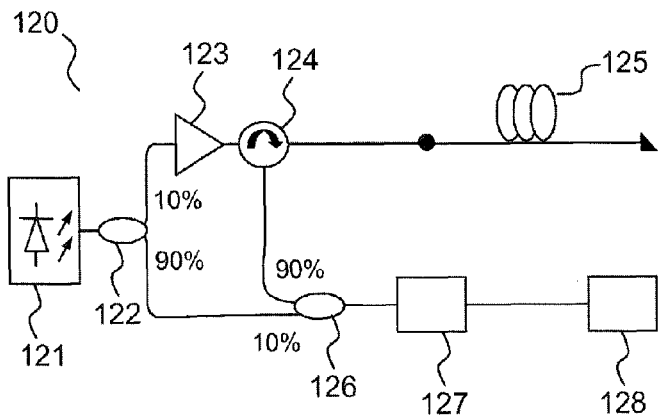
FIG. 12, a diagram of an experimental device for measuring the Brillouin gain.

The Brillouin gain during the amplifier test phases is measured for example by means of a known experimental device such as described in the article by G. Canat et al. ("Characteristics of the Brillouin spectra in Erbium-Ytterbium fibers), a diagram of which is reproduced in FIG. 12. The device 120 comprises a master oscillator laser 121 of smaller spectral width than the Brillouin gain width (for example a DFB laser diode of spectral width 500 kHz), a 10/90 fibered coupler (122) which generates a wave to be amplified and a local oscillator, a doped optical fiber amplifier 123, a fibered circulator 124, the fiber to be tested 125 whose end is cleaved at an angle, a 10/90 fibered coupler (126), a detector 127 whose passband makes it possible to detect beating between the local oscillator tapped off from the master oscillator and the Stokes wave backscattered by the Brillouin scattering. The beating oscillates at the frequency $\upsilon_B$ of the order of 11 GHz for incident light emitted at 1.55 µm, of the order of 16 GHz for an incident wave emitted at a wavelength of close to 1.06 µm and of the order of 8.5 GHz for an incident wave emitted at a wavelength of close to 2 µm. The radio-frequency signal generated by the photodetector can be recorded with an electrical spectrum analyzer 128 of sufficient passband and sensitivity. The fibered components may advantageously be polarization-maintaining or a polarization controller may be added between the two couplers.

FIGS. 7 to 10 illustrate the effect of the specific features of the fibers on the rise in the Brillouin threshold and show how the tailoring of the elongation profile may allow optimization thereof.

Figure 7:
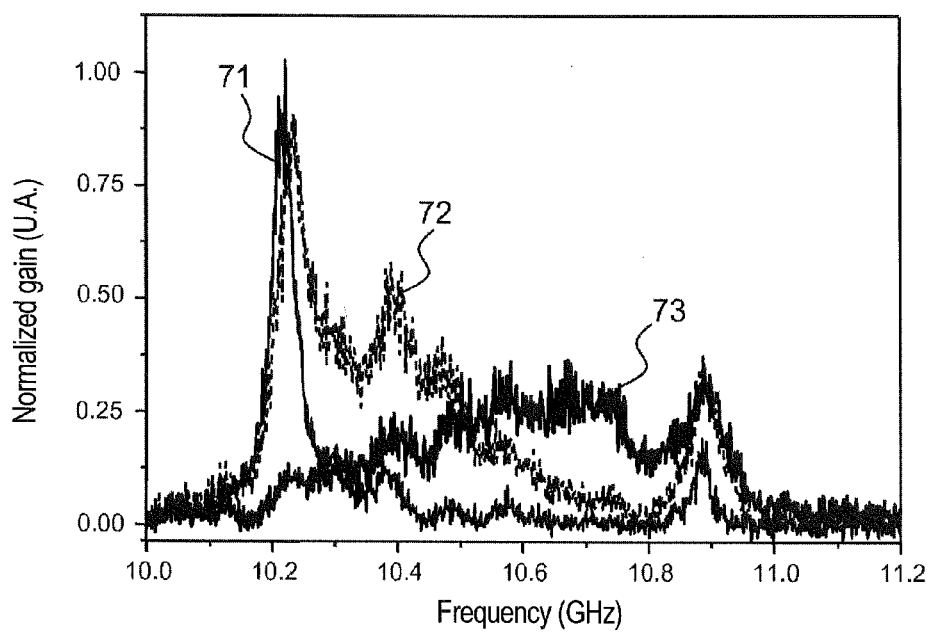
FIG. 7, experimental curves showing the spectral shape of the Brillouin gain in various configurations of elongation of an amplifying optical fiber exhibiting without stretch a Brillouin gain of the type of that illustrated in FIG. 11A.

FIG. 7 illustrates the spectrum of the measured Brillouin gain of a 3 m long fiber of type F pumped at 975 nm in co-propagating mode, at the end of which is an output fiber pigtail made of fiber A and subjected to an elongation profile of the type of that represented in FIG. 5 for three different values of maximum elongation. Curve 71 corresponds to a zero maximum elongation (no strain); it is therefore the same curve as that represented in FIG. 11A. Curve 72 corresponds to a first maximum elongation value and curve 73 to a second maximum elongation value, greater than the first value. It is observed on the basis of these curves that for the highest maximum elongation (curve 73), the spectrum of the doped fiber and that of the output fiber pigtail overlap. In this case the Brillouin threshold will no longer increase. The tailoring of the elongation profile thus makes it possible not to increase the maximum elongation value beyond a limit value onwards of which the Brillouin threshold rise effect will no longer be obtainable.

Figure 8:
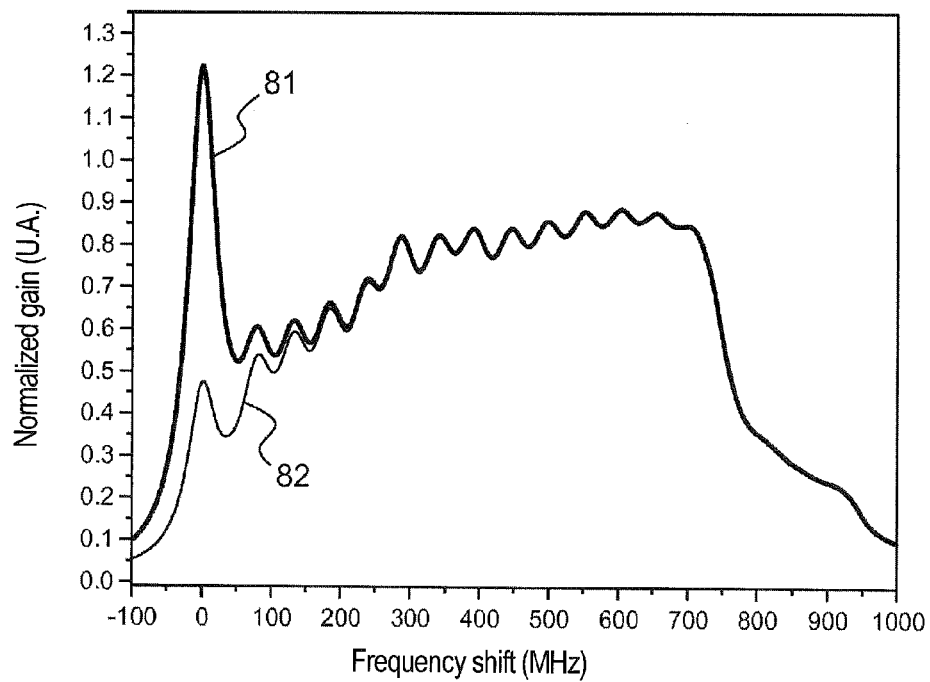
FIG. 8, curves obtained by numerical simulation showing the spectral shape of the Brillouin gain in an amplifying optical fiber exhibiting a Brillouin gain of the type of that illustrated in FIG. 11A, stretched over the whole of its length except a zone of 25 cm and 10 cm at its output, respectively.

FIG. 8 illustrates the influence of the presence of an unstrained fiber portion at the end of the amplifying fiber. Curve 81 shows the spectrum of the Brillouin gain with an amplifying optical fiber of type F exhibiting an elongation profile of the type of that of FIG. 5 and at the output end of which is also found a 25 cm piece of fiber of the same type, unstrained. FIG. 8 shows the spectrum of the Brillouin gain with the same amplifying optical fiber but the unstrained piece of fiber is 10 cm, the splicing having been done before tensioning. The residual peak is observed clearly on curve 81 due to the unstrained piece of fiber. It will therefore be sought to limit the unstrained fiber length on the side of the output end of the amplifying fiber. Accordingly, the splicing of the fibered passive elements before the straining of the fiber by virtue of the deformable structure described in the present patent application is advantageous.

Figure 9:
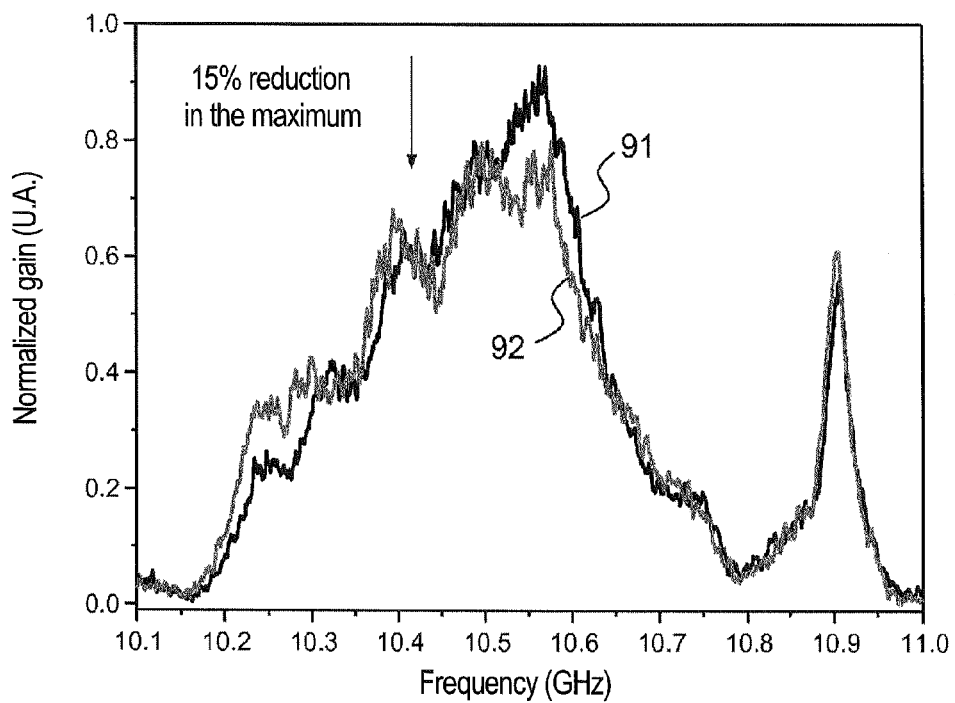
FIG. 9, experimental curves showing the spectral shape of the Brillouin gain in a fiber amplifier produced with a deformable structure of the type of that of FIG. 3B and an amplifying fiber exhibiting a Brillouin gain of the type of that illustrated in FIG. 11A.

FIG. 9 illustrates the possibility of readily modifying the elongation profile and the impact on the spectrum. An amplifier has been produced with a length of 3 m of fiber F pumped in a co-propagating configuration by a multistrand coupler. The fiber is firstly configured according to a first configuration. In this first configuration, 60 cm of fiber are left uncoiled and then the remainder of the amplifying optical fiber is coiled by means of a device of the type of that of FIG. 3B. More precisely, 6.5 coils 6.5 cm in diameter are coiled on the side 341a at the fiber input and 5.5 coils are coiled on the side 341b at the fiber output; the deformable structure is thereafter used to strain the fiber and the Brillouin gain spectrum is recorded (curve 91). The device is then unstretched and then the arrangement of the coils is modified according to a second configuration. In this second configuration, 60 cm of fiber are again left uncoiled at the fiber input, and then 5.5 coils 6.5 cm in diameter are coiled on the side 341a at the fiber input and 6.5 coils are coiled on the side 341b at the fiber output. The device is restretched so as to confer the same maximum elongation (curve 92). It is noted that this operation has made it possible at constant maximum elongation to reduce the effective maximum Brillouin gain by 15%.

Figure 10:
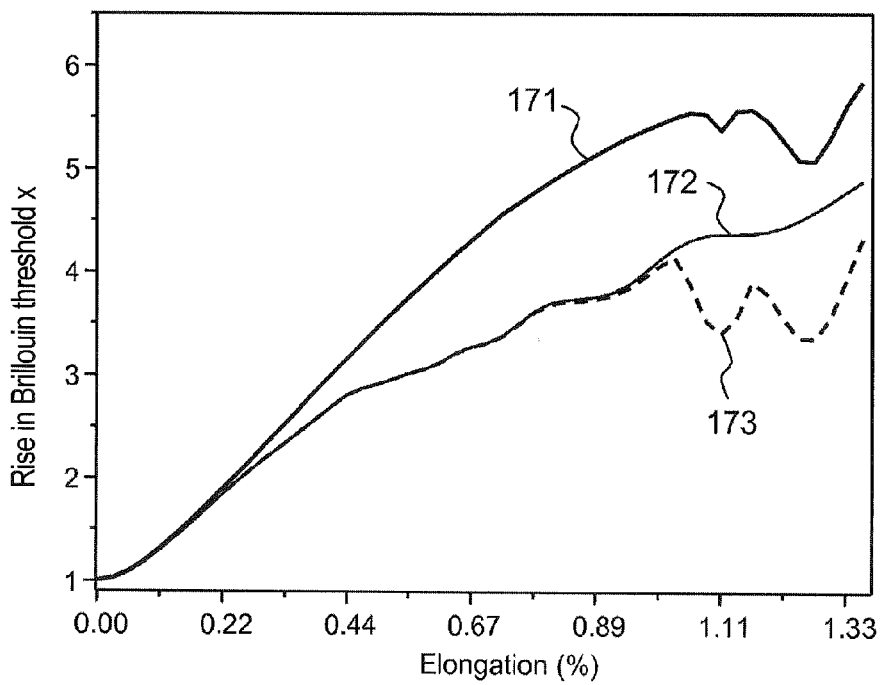
FIG. 10, curves obtained by numerical simulation showing rise in the Brillouin threshold as a function of the maximum value of elongation, with an amplifying optical fiber exhibiting a Brillouin gain of the type of that illustrated in FIG. 11A, and stretched according to a profile of the type of that of FIG. 5.

FIG. 10 represents the Brillouin threshold rise calculated with the amplifying optical fiber referenced F (curves 172 and 173) the spectrum of whose Brillouin gain is represented in FIG. 11A, and to which an elongation profile of the type of FIG. 5 is applied, as a function of the maximum elongation value. Curves 172 and 173 correspond respectively to the calculation performed with the fiber F with no output fiber pigtail (curve 172) subsequently referred to as configuration A and in the presence of a 25 cm output fiber pigtail, with a peak corresponding to the output fiber pigtail (106, FIG. 11A) situated at 10.7 GHz and subsequently referred to as configuration B. These two curves are compared with the curve 171 calculated with a fiber which would have a similar Brillouin gain spectrum but without secondary peaks and a 25 cm output fiber pigtail with a peak corresponding to the output fiber pigtail exhibiting a peak at 10.8 GHz and subsequently referred to as configuration C. FIG. 10 highlights the saturation of the rise in the Brillouin gain as a function of the maximum elongation due to the presence of the output fiber pigtail. Moreover, a comparison of curves 172 and 173 shows the influence of the secondary peaks and of the position of the peak corresponding to the output fiber pigtail in the rise in the Brillouin gain. The presence of secondary peaks with an amplitude relative to the main peak of the order of 10% also leads to saturation of the rise in the Brillouin threshold as a function of the maximum elongation, even in the absence of any output fiber pigtail.

The Brillouin threshold rise saturation effect shown through the various previous examples has important consequences for the reliability of the amplifier. Indeed, the lifetime of a fiber to which a mechanical tensile strain is applied is limited by the growth of structural defects. It is generally considered that an elongation of less than 1% safeguards a reasonable lifetime of greater than a year. It is possible to use greater elongations of up to around 5% elongation if an increase in the probability of breakage is accepted. More precisely, the lifetime of a fiber subjected to an elongation $\epsilon$ is described by a known law termed Weibull's law. Thus, the lifetime of a segment of length L having to resist with a given probability a stress $\sigma$ proportional to the elongations is given by $t(L, \sigma) = CL^{-1/b}\sigma^{-n}$ where n~20 and b and C are constants. The lifetime is therefore at risk of being greatly reduced by the additional increase in strain. It will be beneficial to tailor the applied tension so as to optimize the lifetime and the increase in the Brillouin threshold. For example, increasing the maximum elongation of the fiber F in configuration B so as to increase the rise in the Brillouin threshold from a factor 3.5 to a factor 4.5 corresponds to an elongation which increases from 0.73% to 1.1%. This corresponds to a reduction in the lifetime by a factor of about 4400 for n=20. In the case of configuration C, the Brillouin threshold is not even increased by the same operation because of the influence of the output fiber pigtail. The possibility of tailoring the strain profile in the course of the tests of the amplifier makes it possible to finely dose the applied strain by observing the Brillouin threshold rise obtained in real time. Under these conditions it is advantageous to employ a device which makes it possible to tailor the spectral shape of the Brillouin gain once the amplifier has been produced in the course of the test phases. This avoids having to characterize all the fibers used and to rely solely on modeling to dimension the device.

Another advantage of the device and of the method of manufacture of an optical fiber amplifier according to the invention is the possibility of keeping the fiber dismantlable throughout the amplifier fine tuning phase. Indeed this makes it possible to adapt the length of the amplifying optical fiber. The optimal length of the amplifying optical fiber used depends on numerous parameters, including the wavelength of the signal to be amplified, the precise wavelength of the pump lasers, the temperature of the fiber, the quantity and the wavelength of spontaneous emission originating from any preamplifiers, etc. It is therefore complex and not very precise to predict the gain of the amplifier by modeling and then to deduce therefrom the optimal elongation distribution to be applied to a fiber of fixed length. Moreover, the characteristics of the fibers are known only to within 10% at best. Thus the length of the fiber in order to attain a given gain will be able to be tailored by about 10% depending on the actual doping level but also the optimization of its composition (in particular the codopants which play a role in inter-ion transfers). In the device described in the present patent application, the fiber is easily dismantlable; it is indeed easy to unstrain the fiber so as to return to a tension free configuration for example by bringing together the rigid parts of the structure shown in FIG. 3B, uncoiling a small amount of fiber, shortening it, reconfiguring it under tension and then redoing the test. It is not necessary to leave a length of fiber strain free in order to redo the tests and anticipate a possible reduction in length. This unstrained portion may indeed limit the rise in the Brillouin threshold, as has been shown with the example illustrated in FIG. 8.

Another aspect of the invention is the choice of the optical amplifying fibers and/or of fiber pigtails that are particularly suitable for the device.

The fibers used may be single-mode, with wide modal area and weakly multimode, or multimode. The use of single-mode fiber makes it possible in particular to improve the spatial quality and to reduce the quantity of amplified spontaneous emission generated by the amplifier. To obtain high powers, the amplifying fiber used can be characterized by a wide modal area and a core diameter of greater than 20 µm so that it guides several modes. It is known that appropriate conditioning of the fiber and appropriate mode matching make it possible nonetheless to obtain satisfactory spatial quality. However, the splices and matching of modes are not perfect. Higher-order modes may be excited at a low power level. The beam at the fiber output then results from the interference of all the excited modes. Depending on the relative phase between the modes, the spatial quality of the beam at output is better or worse. It is therefore advantageous, once the various splices and mode matchings have been carried out, to use a structure in accordance with the present description to modify the phase between the modes by modifying $\epsilon_{max}$ which affects the relative phase between the modes via the modification of the length of the fiber and the elasto-optical effect.

If the devices for adapting modes are of very good quality, the beam exiting the amplifying fiber is characterized by excellent spatial quality measurable, for example, by its propagation parameter $M^2$ and the stability of its divergence according to the temperature of the fiber or the wavelength of the injected signal. When the amplifying fiber is characterized by a small difference in effective index (typically less than $10^{-3}$) between the fundamental mode and the higher-order mode of the closest effective index, the spatial quality at the fiber output is sensitive to the exterior perturbations (in particular the strains applied to the fiber). Now, the large tension exerted on the fiber by the device in accordance with the invention is manifested by a force that it exerts thereon. This force creates a strain field in the fiber perpendicular to the axis of the latter which may perturb the index profile by elasto-optical effect. Indeed according to this effect, the refractive index undergoes a variation proportional to the strains internal to the fiber. According to a variant of the invention, the structure or the fiber is covered with an elastic material or elastomer whose thickness is large compared with the size of the contact zone defined by Hertz contact theory. This layer is characterized by a Young's modulus of preferably less than 100 MPa and a thickness of preferably greater than 500 µm. A Young's modulus of less than 10 Mpa and a thickness of greater than 1 mm and of sufficient hardness will be preferred. This makes it possible to increase the contact zone between the structure and the fiber. This results in a reduction in the perturbation of the index profile by the strain. The spatial quality of the beam at the fiber output is thus preserved. The applicant has shown that this variant also makes it possible to safeguard the linear polarization state in a polarization-maintaining fiber which might be perturbed by the phenomena described above. According to another variant, the polymer coating of the optical fiber used possesses a layer of greater than 500 µm in thickness and a modulus of less than 100 MPa. According to another variant, the structure is grooved and the fiber is stuck in the groove whose radius is very similar to the external radius of the optical fiber.

According to a variant, an amplifying fiber can be chosen whose main Brillouin peak is situated at a higher frequency than that of the peak of the output fiber pigtail. FIG. 11B shows for example the spectrum 110 of the Brillouin gain of an amplifying optical fiber whose application to the optical fiber amplifier according to the present invention is advantageous. It entails an Erbium doped fiber (D in table 2) to the output end of which is fixed an output fiber pigtail made of passive fiber A, 20 cm in length. A peak 111 corresponding to the Brillouin gain of the amplifying fiber and a peak 112 corresponding to the output fiber pigtail are observed on the spectrum 110. The Brillouin frequency of the output fiber pigtail being lower than that of the doped fiber, there is no risk of overlap of the peaks during the elongation of the amplifying fiber. It is therefore advantageous to use the device in accordance with the invention with a doped fiber whose main peak is situated at a higher frequency than that of the main peak of the output fiber pigtail. These frequencies can be measured with the aid of the device described by means of FIG. 12 hereinabove.

According to a variant, an amplifying fiber is chosen whose main peak is situated more than 400 MHz below the peak of the output fiber pigtail. Thus when the amplifying fiber is placed in the device, a shift of about 10 spectral widths $\Delta\nu_B$ may be obtained before observing a coincidence between the amplifying fiber peak shifted by elongation and the output fiber pigtail peak. Likewise, the influence of the presence of optional secondary peaks is less problematic. The amplifying fibers B, E and F are in this situation for an output fiber pigtail made of fiber A. This is more generally the case for an Erbium-Ytterbium fiber of large numerical aperture (numerical aperture>0.16) with a significant phosphorus concentration (typically >12% weight) and a lightly doped fiber of the output fiber pigtail (numerical aperture 0.13 or less).

It is also possible to calculate the frequencies of the fibers used to verify that they fulfill the best conditions. The acoustic speed of the longitudinal waves in pure silica equals $V_{Lcladding}=5944$ m/s. The speed in the core $V_{Lcore}$ depends on the concentrations of the various dopants and codopants. The variation of speed with respect to $V_{Lcladding}$ in % can be estimated on the basis of the concentrations of Germanium oxide $GeO_2$, phosphorus oxide $P_2O_5$, aluminum oxide $Al_2O_3$, and fluorine F introduced into the fiber.

Finally, it is also advantageous to use a doped fiber such that its spectrum does not exhibit any acoustic secondary peak. This situation is produced if the normalized acoustic frequency of the core is less than 2.405. This normalized frequency is defined by $$V = qa\left(\frac{V_{Lsheath}^2}{V_{Lcore}^2} - 1\right)^{1/2}$$

where q is the acoustic wave vector equal to 2 times the propagation constant of the optical mode β, a is the radius of the core, $V_{Lcladding}$ designates the longitudinal acoustic speed in the cladding and $V_{Lcore}$ is the longitudinal acoustic speed in the core. This is also the case if the fiber does not guide any acoustic mode if $V_{core} \geq V_{Lcladding}$. In the case where the acoustic speed varies in the core, then the maximum acoustic speed in the core is taken for $V_{Lcore}$.

Figure 13:
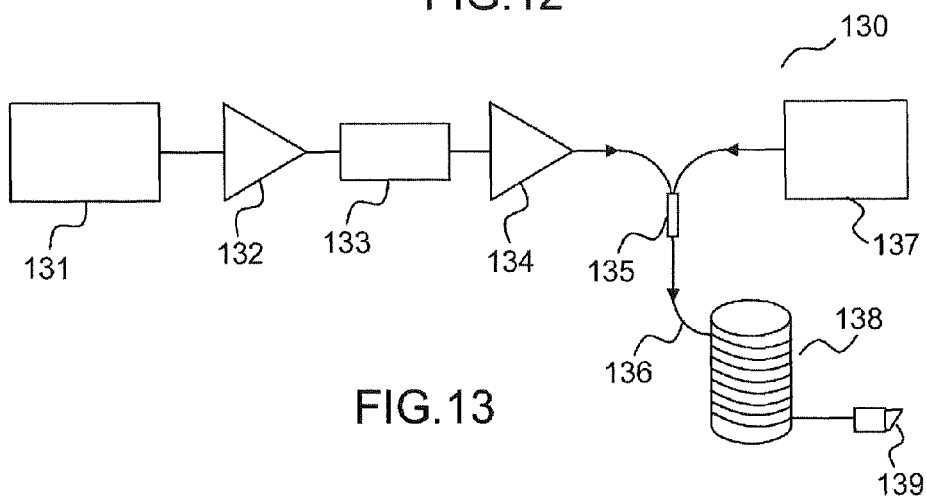
FIG. 13, a diagram of an exemplary embodiment of an amplified master oscillator system comprising a fiber amplifier according to the invention.

A deformable structure of the type of that represented in FIG. 3B has been used in a system of amplified master oscillator type to increase the threshold of occurrence of the Brillouin effect in a pulse amplifying fibered optical amplifier. FIG. 13 represents in a schematic manner an example of an amplified master oscillator master system such as this. A continuous fibered laser source 131 (for example a laser diode) of low power (typically 20 mW) but of low spectral width (<10 kHz) emitting around the wavelength 1545 nm is amplified by a first fibered optical amplifier 132 up to a power of about 200 mW. A fibered acousto-optical modulator (AOM) 133 is thereafter used to chop pulses at a variable repetition frequency of 10 to 100 kHz. These pulses are amplified by a second fibered optical amplifier 134, making it possible to raise the peak power from 200 mW to about 20 W peak. The output fiber of the second amplifier is connected to the last amplification stage via an isolator (not represented). The final amplification stage consists of a piece of amplifying optical fiber, in this example a portion of amplifying optical fiber of type F (table 2) 2 m in length. It is coiled on a deformable structure of the type of that represented in FIG. 3B. In this case, the structure comprises two movable half-cylinders (341a and 341b in FIG. 3B) of radius 3.5 cm and of length 10 cm and a movable half-cylinder (342 in FIG. 3B) of radius 3.5 cm and of length 20 cm, on which the fiber is coiled with 5 coils on each side of the central aperture. A multistrand coupler 135 makes it possible to inject simultaneously into this fiber the preamplified signal, and the pump light generated by 6 pump diodes 137 at a wavelength of close to 975 nm, in a co-propagating configuration. To the output of the fiber is spliced an output fiber pigtail made of passive optical fiber of type A (table 2) of length 15 cm fitted with an FC/APC connector 139.

Figure 14:
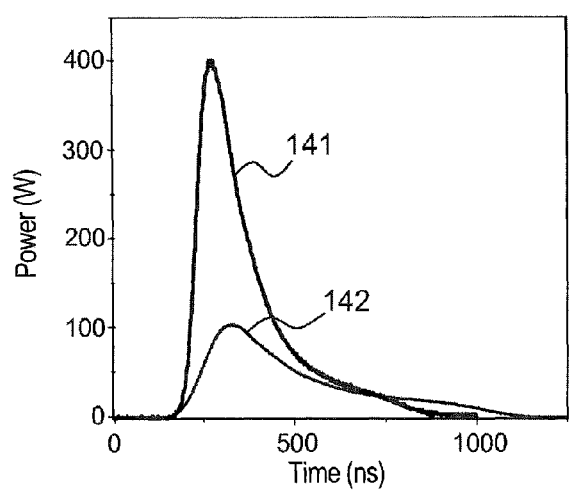
FIG. 14, experimental curves showing the signal output power obtained with a system of the type of that of FIG. 13.

FIG. 14 illustrates the peak power obtained with the system represented in FIG. 13, in two different operational configurations. In the first configuration, the half-cylinders are not separated so that the amplifying fiber of the last stage is not under tension. The maximum peak power obtained represented by curve 142 is 120 W, for a pulse duration of 370 ns at a rate of 27 kHz for a coupled pump power of 4.5 W. The power is then limited by the Brillouin effect. In a second configuration, the two half-cylinders are gradually separated in an equal manner on both sides of the device. For a maximum separation of e=1.5 mm, the maximum peak power obtained is 400 W for a duration of 7 kHz for a pump power of 4.5 W showing a considerable gain in the peak output power.

Such a system possesses numerous applications, for example in lidar systems, in particular for coherent detection lidars.

Although described through a certain number of detailed exemplary embodiments, the structure and the method for producing the optical fiber amplifier according to the invention comprise alternative variants, modifications and enhancements which will be apparent in an obvious manner to the person skilled in the art, it being understood that these alternative variants, modifications and enhancements form part of the scope of the invention, such as defined by the claims which follow.

The invention claimed is:

1. An optical fiber amplifier with high Brillouin threshold comprising:
    an amplifying optical fiber comprising a core and a cladding, which is suitable for the amplification of a signal beam propagating in said core;
    a first coupling device for coupling a signal beam in an input end of said amplifying optical fiber,
    a second coupling device for coupling a laser pump beam for the pumping of said amplifying optical fiber,
    a structure comprising a deformable part around which at least one part of said amplifying optical fiber is wound in the form of coils, said coils being in contact with a surface of said deformable part, the rubbing of said optical fiber on said surface causing during the deformation of said deformable part an elongation of said amplifying optical fiber according to an elongation profile varying from one coil to the next.

2. The optical fiber amplifier as claimed in claim 1, wherein said amplifying optical fiber is fixed to said structure at a given number of fixing points, the elongation of the amplifying optical fiber at said fixing points being less than 0.3%.

3. The optical fiber amplifier as claimed in claim 2, in which the distance between the fixing point closest to an output end of the amplifying optical fiber and said output end is less than 25 cm.

4. The optical fiber amplifier as claimed in claim 1, wherein the elongation profile comprises several local extrema, the absolute values of the variations in elongation between two extrema forming an increasing series between the input and the output of the amplifying optical fiber.

5. The optical fiber amplifier as claimed in claim 1, wherein the elongation profile comprises a single local maximum.

6. The optical fiber amplifier as claimed in claim 5, wherein the second coupling device is suitable for a co-propagating pumping in the pump clad, the single local maximum is attained in the vicinity of a given distance from the input end of the amplifying optical fiber, said distance being a fraction x of the length of the amplifying optical fiber such that 0.4<x<0.6.

7. The optical fiber amplifier as claimed in claim 5, wherein the second coupling device is suitable for a counter-propagating pumping in the pump clad or co-propagating pumping in the core, the single local maximum is attained in the vicinity of a given distance from the input end of the amplifying optical fiber, said distance being a fraction x of the length of the amplifying optical fiber such that 0.5<x<0.9.

8. The optical fiber amplifier as claimed in claim 1, wherein said deformable part of the structure comprises at least two rigid parts around which said part of the optical fiber is wound in the form of coils, the deformation of the structure being obtained by separation of said rigid parts.

9. The optical fiber amplifier as claimed in claim 8, wherein said deformable part of the structure comprises a first fixed rigid part and two other movable rigid parts, one end of which is fixed to said fixed part and the other end of which can be separated, thus allowing the deformation of said deformable part.

10. The optical fiber amplifier as claimed in claim 8, wherein said rigid parts have half-cylinder shapes.

11. The optical fiber amplifier as claimed in claim 1, further comprising a passive fiber pigtail spliced to an output end of said amplifying optical fiber, wherein the Brillouin spectrum of the amplifying fiber/output fiber pigtail assembly, when it is subjected to a zero tension, comprises at least two peaks, including a main peak corresponding to the Brillouin gain of the amplifying fiber and a peak corresponding to the Brillouin gain of the output fiber pigtail, the peak corresponding to the Brillouin gain of the output fiber pigtail exhibiting a lower frequency than said main peak corresponding to the Brillouin gain of the amplifying fiber.

12. The optical fiber amplifier as claimed in claim 1, further comprising a passive fiber pigtail spliced at the output end of said amplifying optical fiber and wherein the Brillouin spectrum of the amplifying fiber/output fiber pigtail assembly, when it is subjected to a zero tension, comprises at least two peaks, including a main peak corresponding to the Brillouin gain of the amplifying fiber and a peak corresponding to the Brillouin gain of the output fiber pigtail, the peak corresponding to the Brillouin gain of the output fiber pigtail exhibiting a frequency at least 400 MHz higher than said main peak corresponding to the Brillouin gain of the amplifying fiber.

13. The optical fiber amplifier as claimed in claim 1, wherein the amplifying optical fiber and/or the structure are covered with an elastic or polymer material.

14. An amplified master oscillator system comprising a laser source for emitting a signal beam, a laser source for emitting a pump beam and an optical fiber amplifier as claimed in claim 1 intended to amplify said signal beam, in which said pump beam is coupled to the amplifying optical fiber of the amplifier.

15. The amplified master oscillator system as claimed in claim 14, in which the elongation profile of the amplifying optical fiber comprises a single local maximum, attained in the vicinity of a given distance from the input end of the amplifying optical fiber, said distance being a fraction x of the length of the amplifying optical fiber determined by minimizing the maximum Brillouin logarithmic gain.

16. A method of manufacture of an amplifier with an amplifying fiber comprising:
    the winding of at least one part of said amplifying optical fiber around a deformable part of a structure in the form of coils, said coils being in contact with a surface of said deformable part of the structure,
    the fixing of the amplifying optical fiber to said structure at at least two fixing points,
    the deformation of said deformable part of the structure, causing by rubbing of said amplifying optical fiber on said surface an elongation of said amplifying optical fiber according to an elongation profile varying from one coil to the next.

17. The method of manufacture as claimed in claim 16, in which said amplifier comprising fibered passive optical elements, the method furthermore comprises one or more prior step(s) of splicing to the at least one of the end(s) of the amplifying optical fiber of said fibered passive optical elements.

18. The method of manufacture as claimed in claim 16, further comprising:
    the coupling of a signal beam in an input end of said amplifying optical fiber,
    the measurement of the Stokes fluorescence spectrum of the backscattered wave resulting from Brillouin scattering in said amplifying optical fiber, and
    the deformation of said deformable structure as a function of the Stokes fluorescence spectrum.

19. The method of manufacture as claimed in claim 18, wherein the elongation profile exhibiting a local maximum, the deformation of said deformable part of the structure comprises the tailoring of the maximum value of the elongation or of the position of the maximum.

* * * * *